United States Patent
Borlick et al.

(10) Patent No.: US 10,783,049 B2
(45) Date of Patent: Sep. 22, 2020

(54) VIRTUAL STORAGE DRIVE MANAGEMENT IN A DATA STORAGE SYSTEM

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Kevin J. Ash, Tucson, AZ (US); Karl A. Nielsen, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 279 days.

(21) Appl. No.: 15/905,780

(22) Filed: Feb. 26, 2018

(65) Prior Publication Data
US 2019/0266062 A1    Aug. 29, 2019

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0631* (2013.01); *G06F 3/0644* (2013.01); *G06F 3/0689* (2013.01); *G06F 2201/805* (2013.01); *G06F 2201/815* (2013.01); *G06F 2201/82* (2013.01)

(58) Field of Classification Search
CPC .... G06F 3/0631; G06F 3/0664; G06F 3/0665; G06F 2009/4557; G06F 9/5077; G06F 11/2043; G06F 11/2094; G06F 11/3442
See application file for complete search history.

(56) References Cited

U.S. PATENT DOCUMENTS

| 7,111,147 B1 | 9/2006 | Strange et al. |
| 7,668,981 B1 | 2/2010 | Nagineni et al. |

(Continued)

FOREIGN PATENT DOCUMENTS

| CN | 103513938 A | 1/2014 |
| WO | WO2016118125 A1 | 7/2016 |

OTHER PUBLICATIONS

Paul Massiglia, "RAID for Enterprise Computing", VERITAS Software Corporation 2000, pp. 45.

(Continued)

*Primary Examiner* — Joseph R Kudirka
(74) *Attorney, Agent, or Firm* — William K. Konrad; Konrad Raynes Davda & Victor LLP

(57) ABSTRACT

In one embodiment, virtual storage drives are allocated to RAID arrays so that no two virtual storage drives of a RAID array are mapped to the same physical storage drive. In another aspect, error handling routines are limited to virtual storage drives impacted by an error in a physical storage drive so that virtual storage drives of the physical storage drive not impacted by the error are bypassed. In yet another aspect, cache operations to a target virtual storage drive may be throttled as a function of both a limit imposed on cache operations directed to the RAID array to which the virtual storage drive is allocated, and a separate limit on cache operations directed to a group of virtual storage drives which are mapped to the same physical storage drive as the target virtual storage drive. Other features and aspects may be realized, depending upon the particular application.

21 Claims, 10 Drawing Sheets

(56) References Cited

U.S. PATENT DOCUMENTS

| | | | |
|---|---|---|---|
| 7,730,259 B2* | 6/2010 | Taguchi | G06F 3/061 |
| | | | 711/114 |
| 8,918,488 B2 | 12/2014 | Umbehocker | |
| 9,798,584 B1 | 10/2017 | Kulkarni et al. | |
| 10,089,026 B1* | 10/2018 | Puhov | G06F 3/0619 |
| 2009/0240880 A1* | 9/2009 | Kawaguchi | G06F 3/0617 |
| | | | 711/114 |
| 2014/0130055 A1 | 5/2014 | Guha | |
| 2014/0325265 A1 | 10/2014 | Sun et al. | |
| 2017/0060442 A1 | 3/2017 | Dunn | |

OTHER PUBLICATIONS

International Search Report and Written Opinion dated Apr. 30, 2019, pp. 9, for Application PCT/IB2019/051222.
English machine translation of CN103513938A dated Jan. 15, 2014, pp. 24.

* cited by examiner

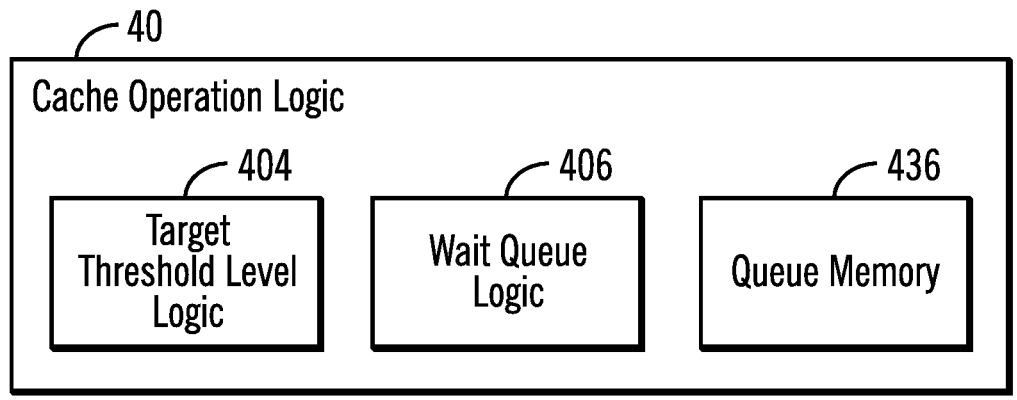
FIG. 12
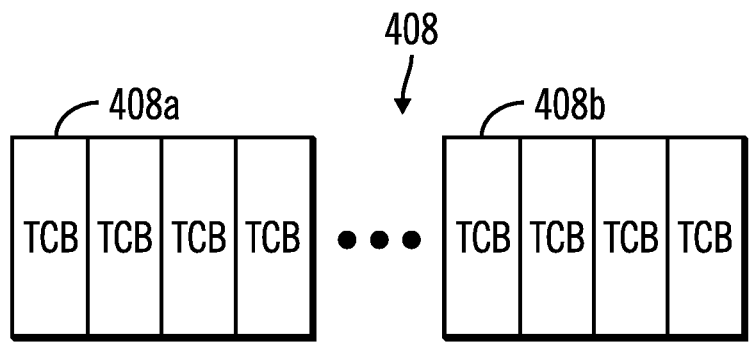
FIG. 13
| VIRTUAL STORAGE DRIVE TCB WAIT QUEUE TABLE ||||||
| | GroupA (Physical Storage DriveA) | GroupB (Physical Storage DriveB) | GroupC (Physical Storage DriveC) | GroupD (Physical Storage DriveD) |
| --- | --- | --- | --- | --- |
| RAID ArrayA | QueueAA | QueueAB | QueueAC | QueueAD |
| RAID ArrayB | QueueBA | QueueBB | QueueBC | QueueBD |
| RAID ArrayC | QueueCA | QueueCB | QueueCC | QueueCD |
| RAID ArrayD | QueueDA | QueueDB | QueueDC | QueueDD |
FIG. 14

VIRTUAL STORAGE DRIVE MANAGEMENT IN A DATA STORAGE SYSTEM

BACKGROUND OF THE INVENTION

1. Field of the Invention

The present invention relates to a computer program product, system, and method for virtual storage drive management in data storage systems.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Accordingly, data from a host to be stored in the data storage system is typically directed to a primary device of a primary data storage system at a local site and then replicated to one or more secondary devices of secondary data storage systems which may be geographically remote systems from the primary data storage system. One primary device can have multiple secondary relationships in which data directed to a primary device is replicated to multiple secondary devices.

A storage controller may control a plurality of storage devices that may include hard disks, tapes, solid state drives, etc. The storage controller may manage Input/Output (I/O) requests from networked hosts to the plurality of storage devices. As the storage capacities of storage devices increase, it is known to fragment or subdivide a physical storage drive into multiple virtual storage drives, each virtual storage drive having virtual storage mapped to a portion of the physical storage of the physical storage drive. The smaller storage capacity of the virtual storage drives may facilitate resource management and improve system performance by the storage controller.

A cache may also be maintained by the storage controller, where the cache may comprise a high speed storage that is accessible more quickly in comparison to certain other storage devices, such as, hard disks, tapes, etc. The cache is used for rapid access to data staged from external storage to service read data access requests, and to provide buffering of modified data. However, the total amount of storage capacity of the cache may be relatively small by comparison to the storage capacity of certain other storage devices, such as, hard disks, etc., that are controlled by the storage controller. Thus, write requests are often first written to the cache and then subsequently written (i.e., destaged) to the external storage devices.

Task Control Block (TCB) is a task control data structure in the operating system kernel containing the information needed to manage a particular process. Storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the storage devices. If the cache is full, the TCB may be queued in a TCB wait queue until existing data in the cache can be destaged (i.e., written to storage devices), in order to free up space. The destage operations may involve the moving of information from cache to storage such as Redundant Array of Independent Disks (RAID) storage and destage TCBs may be allocated for performing the destage operations.

Directing too many stage or destage operations to any one particular RAID array (also known as a RAID rank) can adversely affect performance. To provide for a more even distribution of such stage and destage operations it is known to "throttle" the number of stage or destage operations on the basis of the RAID array to which cache operations are directed. Thus, each RAID array may have an associated upper limit on the number of stage or destage TCBs allocated and dispatched to perform cache operations directed to the particular RAID array or array. Once that limit is reached, any additional TCBs for cache operations to be directed to the particular RAID array or array are queued in a TCB wait queue to await freeing up (deallocation) of TCBs for the particular RAID array or array. Upon deallocation of a TCB for the RAID array, a waiting TCB may be dequeued from the TCB wait queue and dispatched to complete the associated cache operation.

Storage controllers frequently employ a safe data commit process which scans the cache directory for modified (often referred to as "dirty") data to be destaged to secondary storage. Such a scan of the cache directory may be initiated on a periodic basis, such as on the hour, for example. A destage operation may also be initiated at other times depending upon host operations.

SUMMARY

One general aspect of a computing environment employing virtual storage drive management in a data storage system in accordance with one aspect of the present description, is directed to creating a plurality of groups of virtual storage drives where creating a group of virtual storage drives includes subdividing a storage area of a physical storage drive into a group of smaller storage areas and mapping each smaller storage area of the group of smaller storage areas to a virtual storage drive of the group of virtual storage drives. Virtual storage drives are allocated to Redundant Array of Independent Disks (RAID) arrays of virtual storage drives in a group identification and drive allocation operation. In one embodiment, the group identification and drive allocation operation includes identifying a group of the plurality of groups of virtual storage drives as an identified group which has no virtual storage drives allocated to the identified RAID array and has a fewest number of virtual storage drives allocated to any RAID array and allocating one virtual drive from the identified group of virtual storage drives to the identified RAID array. A determination is made as to whether the identified RAID array is complete and repeating the group identification and drive allocation operation until the identified RAID array is complete.

For example, in one embodiment, RAID array logic may be configured to automatically allocate virtual storage drives to RAID arrays of virtual storage drives in such a manner so as to ensure that no two virtual storage drives of any RAID array are mapped to the same physical storage drive. As a result, failure of any one physical storage drive will not cause failure of more than one virtual storage drive in any one RAID array. Further, the data of the failed virtual storage drive of each array may be more readily reconstructed using appropriate RAID data reconstruction techniques.

Furthermore, the RAID array logic may be configured to automatically allocate virtual storage drives to RAID arrays of virtual storage drives in such a manner as to ensure a more even distribution of the physical storage drives mapped to the virtual storage drives. As a result, the number of RAID arrays impacted by the loss of a particular physical storage drive may be reduced or minimized. Further, uneven workload distribution leading to overdriving of individual physical storage drives may be reduced by a more even distribution of the physical storage drives mapped to the virtual storage drives.

In another aspect of virtual storage drive management in accordance with the present description, in response to detecting an error in a virtual storage drive of a group of virtual drives of a physical storage drive, an identification is made as to which physical storage drive includes a virtual drive having a detected error, and identifying which storage areas of an identified physical storage drive are impacted by a detected error. A determination is made as to whether combined storage areas identified as impacted by a detected error are less than total storage areas of the identified physical storage drive and if so, identifying a set of virtual storage drives mapped to combined storage areas identified as impacted by a detected error. In addition, error handling routines are initiated for identified set of virtual drives. In this manner, error handling routines may be focused upon the impacted virtual storage drives of a physical storage drive while bypassing virtual storage drives of the same physical storage drive which are not impacted by the error. As a result, efficiency in error handling may be improved.

In yet another aspect of virtual storage drive management in accordance with the present description, a determination is made as to whether all storage areas of the identified physical storage drive are impacted by a detected error. If so, error handling routines are initiated for all virtual storage drives of the group of virtual storage drives of the identified physical storage drive. Here too, error handling routines may be focused upon all the impacted virtual storage drives of a physical storage drive to improve error handling efficiency.

Still another aspect of virtual storage drive management in accordance with the present description, is directed to receiving a first task control block allocated to control a first cache operation to transfer data between a cache and a first target virtual storage drive of a first target RAID array and of a first target group of virtual storage drives of a first target physical storage drive where the first cache operation is one of a stage operation to stage data from the first target virtual storage drive to the cache and a destage operation to destage data from the cache to the first target virtual storage drive. A determination is made as to whether the first allocated task control block exceeds a first limit of allocated task control blocks assigned to the first target RAID array, and in response to a determination that the first allocated task control block exceeds the first limit of allocated task control blocks assigned to the first target RAID array, queueing the first allocated task control block in a wait queue to defer dispatching of the first allocated task control block to perform the first cache operation. Conversely, in response to a determination that the first allocated task control block does not exceed the first limit of allocated task control blocks assigned to the first target RAID array, a determination is made as to whether the first allocated task control block exceeds a second limit of allocated task control blocks assigned to the first target group of virtual storage drives, and if not, dispatching the first allocated task control block to perform the first cache operation, instead of queueing the first allocated task control block in a wait queue to defer dispatching of the first allocated task control block to perform the first cache operation. In response to a determination that the first allocated task control block does exceed the second limit of allocated task control blocks assigned to the first target group of virtual storage drives, the first allocated task control block is queued in a wait queue to defer dispatching of the first allocated task control block to perform the first cache operation.

Thus, in one embodiment, if neither limit is exceeded, the task control block is dispatched to perform the associated cache operation in connection with the target virtual storage drive. Conversely, if either limit is exceeded, wait queue logic queues the allocated task control block in a TCB wait queue for the target virtual storage drive to defer dispatching of the allocated task control block. In this manner, task control blocks for a particular virtual storage drive may be throttled both on the basis of the identity of the RAID array of the target virtual storage drive as well as the identity of the physical storage drive mapped to the target virtual storage drive of the cache operation, to avoid overloading any one particular RAID array or physical storage drive with too many cache operations. As a result, system performance may be improved.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 5 illustrates an example of a storage area of a physical storage drive subdivided into multiple smaller storage areas mapped to virtual storage drives of a group of virtual storage drives in accordance with one aspect of the present description.

FIG. 6 is an example of a table mapping virtual storage drives to physical storage drives, groups of virtual storage drives, physical storage areas, RAID arrays and TCB wait queues in accordance with one aspect of the present description.

FIG. 12 depicts an example of cache operation logic in one embodiment employing virtual storage drive management in accordance with one aspect of the present description.

FIG. 13 depicts an example of a TCB wait queue assigned to a virtual storage drive as a function of the identities of the RAID array and the virtual storage drive group of the virtual storage drive in accordance with one aspect of the present description.

FIG. 14 depicts an example of a table mapping TCB wait queues to virtual storage drives as a function of the identities of the RAID array and the virtual storage drive group of each virtual storage drive in accordance with one aspect of the present description.

DETAILED DESCRIPTION

Figure 1:
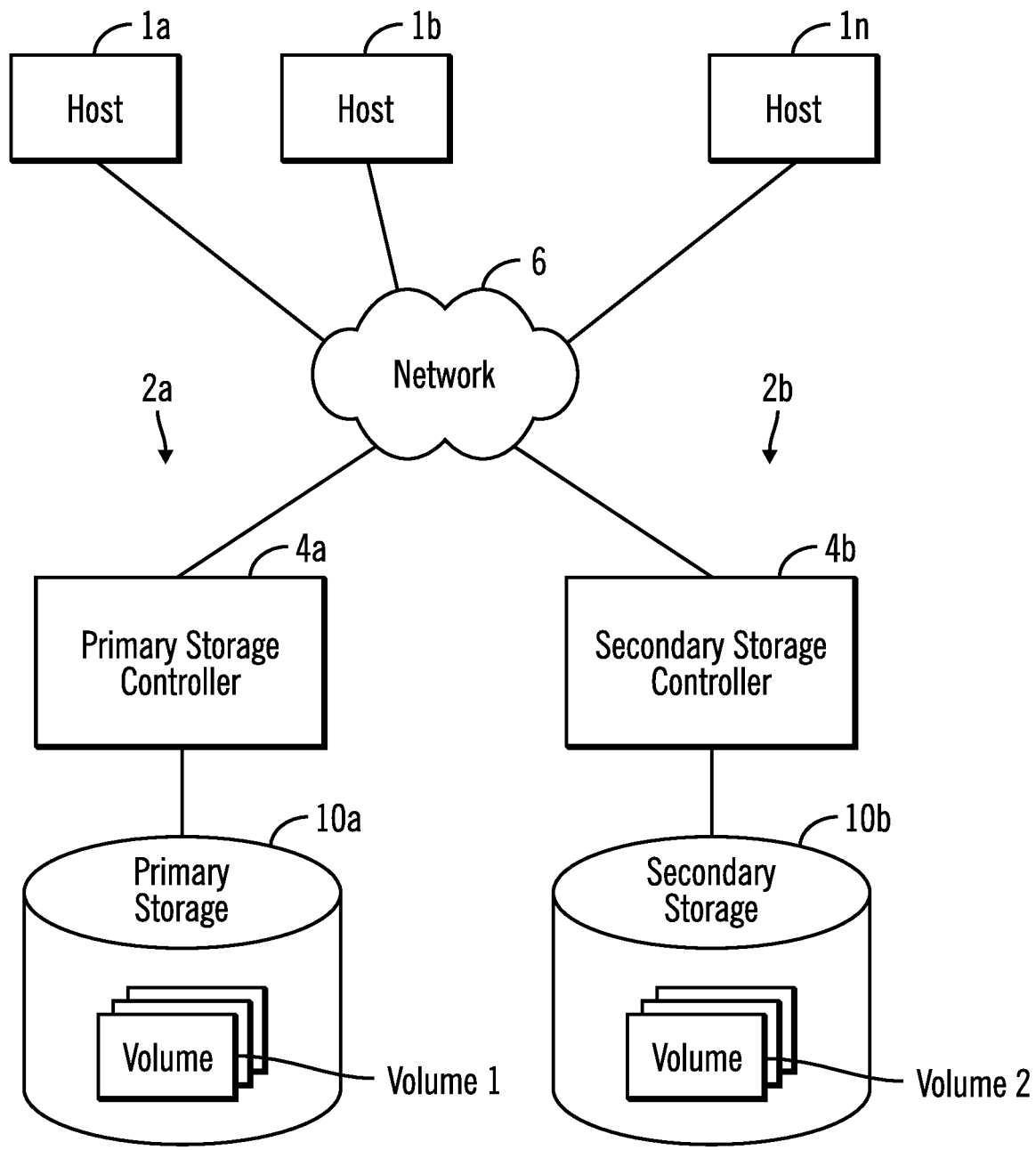
FIG. 1 illustrates an embodiment of a computing environment employing virtual storage drive management in a data storage system in accordance with one aspect of the present description.

Although fragmenting or subdividing high capacity physical drives into multiple virtual storage drives can improve performance, it is appreciated herein that configuring any one RAID array (or RAID rank) with more than one virtual storage drive mapped to a single physical drive, can increase the likelihood of data loss in the event that the physical storage drive supporting multiple virtual storage drives of the array fails. Accordingly, in one aspect of a storage controller or other computer system employing virtual storage drive management in accordance with the present description, RAID array logic is configured to automatically allocate virtual storage drives to RAID arrays of virtual storage drives in such a manner so as to ensure that no two virtual storage drives of any RAID array are mapped to the same physical storage drive. As a result, failure of any one physical storage drive will not cause failure of more than one virtual storage drive in any one RAID array. Further, the data of the failed virtual storage drive of each array may be more readily reconstructed using appropriate RAID data reconstruction techniques.

In another aspect of the present description, the RAID array logic may be configured to automatically allocate virtual storage drives to RAID arrays of virtual storage drives in such a manner as to ensure a more even distribution of the physical storage drives mapped to the virtual storage drives. As a result, the number of RAID arrays impacted by the loss of a particular physical storage drive may be reduced or minimized. Further, uneven workload distribution leading to overdriving of individual physical storage drives may be reduced by a more even distribution of the physical storage drives mapped to the virtual storage drives.

In one embodiment, the RAID array logic in allocating virtual storage drives to a RAID array performs an automated group identification and drive allocation operation which includes for an identified RAID array, identifying a group of virtual storage drives which has no virtual storage drives allocated to the identified RAID array and also has a fewest number of virtual storage drives allocated to any RAID array as compared to other groups having no virtual storage drives allocated to the identified RAID array. The RAID array logic allocates one virtual drive from the identified group of virtual storage drives to the identified RAID array. A determination is made as to whether the identified RAID array is complete and the logic repeats the group identification and drive allocation operation until the identified RAID array is complete.

In another aspect of a storage controller or other computer system employing virtual storage drive management in accordance with the present description, error handling logic is configured to detect an error in a virtual storage drive and automatically identify which physical drive is mapped to the virtual drive having a detected error. In addition, the error handling logic automatically identifies which storage areas of an identified physical storage drive are impacted by a detected error. If the error handling logic determines that all storage areas of the identified physical storage drive are impacted by a detected error, that is a "global" area of error impact, error handling routines may be initiated for all virtual storage drives of the identified physical storage drive. Conversely, if the error handling logic determines that the combined storage areas identified as impacted by a detected error are less than the total storage areas of the identified physical storage drive, that is, the area of impact of the error is a "local" area of error impact, a set of virtual storage drives mapped to the combined storage areas, that is, the local area of error impact, is identified, and error handling routines for the identified set of virtual drives are initiated. In this manner, error handling routines may be focused upon the impacted virtual storage drives of a physical storage drive while bypassing virtual storage drives of the same physical storage drive which are not impacted by the error. As a result, efficiency in error handling may be improved.

In yet another aspect of a storage controller or other computer system employing virtual storage drive management in accordance with the present description, target threshold level logic determines both whether an allocated task control block which targets a particular virtual storage drive, exceeds a first limit of allocated task control blocks assigned to the RAID array of the target virtual storage drive, and if not, also determines whether the allocated task control block exceeds a second limit of allocated task control blocks assigned to the physical storage drive of the target virtual storage drive. The physical storage drive of the target virtual storage drive defines a group of virtual storage drives all mapped to the same physical storage drive, wherein the group includes the target virtual storage drive as a member of the group.

If neither limit is exceeded, the task control block is dispatched to perform the associated cache operation in connection with the target virtual storage drive. Conversely, if either limit is exceeded, wait queue logic queues the allocated task control block in a TCB wait queue for the target virtual storage drive to defer dispatching of the allocated task control block. Upon deallocation of a sufficient number of task control blocks upon completion of other cache operations to transfer data between a cache and the virtual storage drive, such that neither limit on the permitted number of TCBs for the RAID array and the physical storage drive of the virtual storage drive, the wait queue logic removes a waiting task control block from the TCB wait queue and dispatches the removed task control block to perform a cache operation directed to the target virtual storage drive.

In this manner, task control blocks for a particular virtual storage drive may be throttled both on the basis of the identity of the RAID array of the target virtual storage drive as well as the identity of the physical storage drive mapped to the target virtual storage drive of the cache operation, to avoid overloading any one particular RAID array or physical storage drive with too many cache operations. As a result, system performance may be improved. Other aspects and advantages may be realized, depending upon the particular application.

A system of one or more computers may be configured for virtual storage drive management in a data storage system in accordance with the present description, by virtue of having software, firmware, hardware, or a combination of them installed on the system that in operation causes or cause the system to perform virtual storage drive management in accordance with the present description. For example, one or more computer programs may be configured to perform virtual storage drive management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
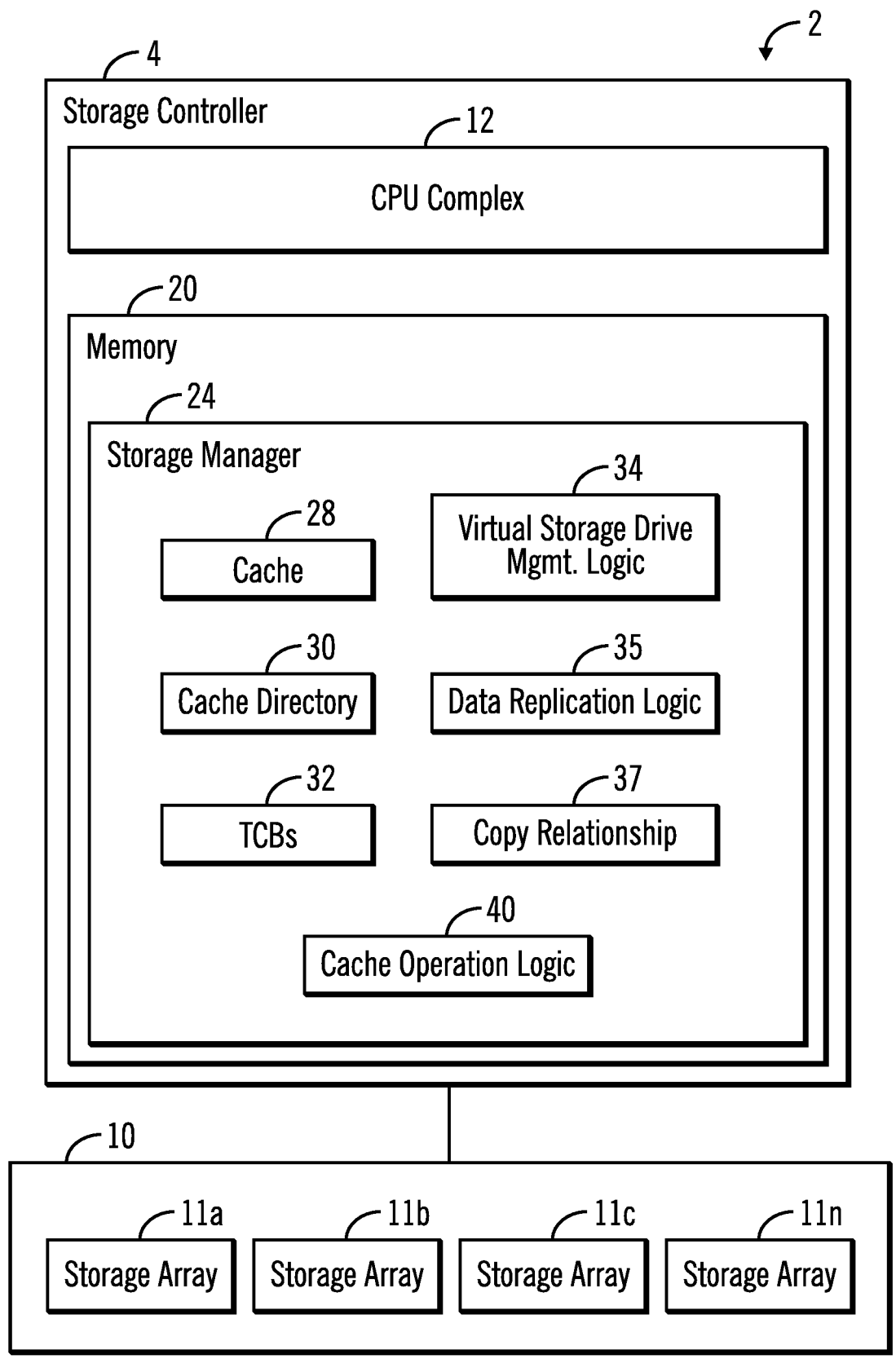
FIG. 2 illustrates an example of a data storage system employing virtual storage drive management in accordance with one aspect of the present description in the computing environment of FIG. 1.

Implementations of the described techniques may include hardware, a method or process, or computer software on a computer-accessible medium. FIGS. 1, 2 illustrate an embodiment of a computing environment employing virtual storage drive management in a data storage system in accordance with the present description. A plurality of hosts 1a, 1b . . . 1n may submit Input/Output (I/O) requests over a network 6 to one or more data storage devices or systems 2a, 2b, 2 (FIG. 2) to read or write data. The hosts 1a, 1b . . . 1n may be separate physical devices or may be virtual devices implemented using assigned resources of partitions of a server, for example. In a similar manner, the data storage system or systems 2 (FIG. 2), 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Each data storage system 2 (FIG. 2), 2a, 2b includes a storage controller or control unit 4 (FIG. 2), 4a, 4b, respectively, which accesses data stored in a plurality of data storage units of storage 10, 10a, 10b, respectively. Each data storage unit of the storage 10, 10a, 10b may comprise any suitable device capable of storing data, such as physical hard disks, solid state drives, etc., known in the art. Thus, in one embodiment, the storage 10, 10a, 10b may be comprised of one or more sequential access storage devices, such as hard disk drives and magnetic tape or may include non-sequential access storage devices such as solid state drives (SSD), for example. Each device of storage 10 (FIG. 2), 10a, 10b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments, for example, storage units may be disks that are configured as a Redundant Array of Independent Disk (RAID) storage arrays 11a (FIG. 2), . . . 11n, in which one or more RAID storage array is an array of hard disks in a RAID configuration to facilitate data recovery in the event of loss of a hard disk. The storage units of the storage 10, 10a, 10b may also other types of storage such as solid state drives in a RAID configuration to facilitate data recovery in the event of loss of a solid state drive. The storage units of the storage 10 (FIG. 2), 10a, 10b may be configured to store data in subunits of data storage such as volumes, tracks, etc.

Each storage controller 4 (FIG. 2), 4a, 4b includes a CPU complex 12 (FIG. 2) including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a, 4b further has a memory 20 that includes a storage manager 24 for managing storage operations including writing data to or reading data from an associated storage 10 (FIG. 2), 10a, 10b in response to an I/O data request from a host or mirrored data from another data storage system. A cache 28 of the memory 20 may comprise one or more of different types of memory, such as RAMs, write caches, read caches, NVS, etc. The different types of memory that comprise the cache may interoperate with each other. The CPU complex 12 of each storage controller 4 (FIG. 2), 4a, 4b may have multiple clusters of processors, each cluster having its own assigned memory 20, storage manager 24, cache 28, etc. The processing and memory resources assigned each cluster may be physical, virtual, shared, transferrable or dedicated, depending upon the particular application.

Writes from the hosts 1a . . . 1n may initially be written to a cache 28 of the primary storage controller 4a and then later destaged to the storage 10a of the primary storage system 2a. Read requests from the hosts 1a . . . 1n may be satisfied from a cache 28 of the primary storage controller 4a if the corresponding information is available in that cache 28, otherwise the information is staged from the storage 10a to the cache 28 and then provided to the requesting host 1a . . . 1n.

Writes from the hosts 1a . . . 1n initially written to the cache 28 and the storage 10a of the primary storage controller 4a, may be mirrored by a storage manager 24 of the primary storage controller 4a to the secondary storage controller 4b. Mirrored data may initially be written to a cache 28 of the secondary storage controller 4b and then later destaged to the storage 10b controlled by the secondary storage controller 4b of the secondary storage system 2b.

The memory 20 of the storage controller 4 (FIG. 2), 4a, 4b includes a cache directory 30 which identifies tracks having data stored in the cache 28 as a result of a prestage or stage operation which transfers the data of a track stored in the storage 10 (FIG. 2), 10a, 10b to the cache 28, or as a result of a host write operation which writes data to the cache 28 for subsequent destaging to the corresponding track or tracks of the storage 10 (FIG. 2), 10a, 10b. In the illustrated embodiment, the cache directory 30 is implemented in the form of a known data structure which is a hash table of all tracks in cache 28. Each track is hashed into a slot of the cache directory 30 which includes a track identification (ID) and an indication as to whether the data of the track is "dirty", that is, has not yet been safely destaged to the corresponding track of the storage 10 (FIG. 2), 10a, 10b. Multiple tracks hashed into a slot are linked together. It is appreciated that a suitable cache directory may be implemented using other types of data structures.

Operations including I/O operations of the storage manager 24, including cache write, stage, prestage and destage operations, for example, utilize Task Control Blocks (TCBs) 32 of the memory 20. Each TCB is a data structure in the operating system kernel containing the information needed to manage a particular process. Storage controllers may move information to and from storage, and to and from the cache by using TCBs to manage the movement of data.

When a write request issues from a host to a storage controller or data is mirrored from the primary data storage system to a secondary data storage system, a TCB may be allocated from the operating system code. In one embodiment a TCB may be used to maintain information about the write process from beginning to end as data to be written is passed from the source through the cache to the storage. If the cache is full, the TCB may be queued until existing data in the cache can be destaged (i.e., written to storage), in order to free up space.

TCBs may be classified on the basis of the task being controlled by the particular TCB. For example, a "background" TCB is a TCB that controls an operation which is not directly related to a host input/output operation. Another type of TCB is a "foreground" TCB that controls an operation which is directly related to a host input/output operation.

In one aspect of the present description, the storage manager 24 includes virtual storage drive management logic 34 which is configured to manage virtual storage drives in a manner so as to improve system performance. The storage manager 24 further includes a data replication logic 35 (FIG. 2) of the storage manager 24 which is configured to synchronously generate copies of the primary volume1 (FIG. 1) of the primary data storage system 2a as a secondary volume2 (FIG. 1) of the secondary data storage systems as represented by the secondary data storage system 2b. A primary-secondary pair of volumes, volume1, volume2 are in an synchronous copy or mirror relationship 37 such that updates to the primary volume1 are synchronously mirrored to each secondary volume2.

One or more copy relationships 37, which may be maintained by the data replication logic 35 for the primary and secondary storage controllers 4a, 4b, (FIG. 1) associate primary storage locations in the primary storage drive 10a and corresponding secondary storage locations in each of the secondary storage drives as represented by the storage drive 10b of the mirror relationship, such that updates to the primary storage drive 10a locations are mirrored, that is, copied to the corresponding secondary storage drive or drives 10b locations. For example, source storage locations in a primary storage volume1 (FIG. 1) of storage drive 10a may be synchronously mirrored in a mirror data replication operation to target storage locations of a secondary volume2 of the storage drive 10b pursuant to a mirror copy relationship 37 (FIG. 2). Similarly, source storage locations in the primary storage volume1 (FIG. 3) of storage drive 10a may be synchronously mirrored in a mirror data replication operation to additional target storage locations of another secondary volume2 of another secondary data storage system pursuant to a mirror copy relationship 37 (FIG. 2).

In the illustrated embodiment, a copy relationship 37 comprises a peer-to-peer synchronous mirror relationship for a pair of storage locations in which updates to the primary (source) storage locations of the mirror relationship 37 are synchronously mirrored to the secondary (target) storage locations of the mirror relationship 37. It is appreciated that other types of copy relationships such as asynchronous, for example, may be established, depending upon the particular application.

In the configuration illustrated in FIG. 1, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship.

In a particular copy relationship, the source unit is often referred to as the primary and the target unit is often referred to as the secondary. Replication relationships are defined between storage units of the primary data storage drive 10a and the secondary data storage drives 10b. Notwithstanding a reference to the data storage drive 10a as "primary" and the data storage 10b as "secondary," particular storage units of the data storages 10a, 10b, may play both a primary (or source role) and a secondary (or target role) depending upon the particular copy relationship.

In data replication systems, data is typically maintained in volume pairs, comprising a primary volume such as volume1 (FIG. 1), for example, in a primary storage system and a corresponding secondary volume such as volume2, for example, in a secondary storage system that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary devices. A primary device such as volume1, for example, may be in a one to many mirror multi-target relationship with multiple secondary devices, such as volume2 of the secondary data storage systems 2b.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

In one embodiment, the storage devices 10, 10a, 10b, may be comprised of one or more sequential access storage devices, such as hard disk drives and magnetic tape or may include non-sequential access storage devices such as solid state drives (SSD), for example. Each storage device 10, 10a, 10b, may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 35 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

The storage manager 24 further includes cache operation logic 40 which stages data from the storage 10 to the cache 28 and also destages data from the cache 28 to the storage 10. In one embodiment, the cache operation logic 40 periodically scans the cache directory 30 for dirty data to be destaged to storage 10 (FIG. 2), 10a, 10b (FIG. 1). One type of cache operation often referred to as a safe data commit process permits an operator to be assured that anything written to cache 28 prior to a safe data commit scan start time has been successfully destaged and safely stored on the storage 10 (FIG. 2), 10a, 10b (FIG. 1). Other types of cache operations of the logic 40 perform stage and destage operations in association with other events, depending upon the particular application.

In the illustrated embodiment, the storage manager 24 including the virtual storage drive management logic 34 and the cache operation logic 40, is depicted as software stored in the memory 20 and executed by the CPU complex 12. However, it is appreciated that the logic functions of the storage manager 24 may be implemented as hardware, software, firmware or combinations of one or more thereof, depending upon the particular application.

The storage manager 24 (FIG. 2) in one embodiment may store data in the cache 28 and transfer data between the cache 28 and storage 10 (FIG. 2), 10a, 10b (FIG. 1) in tracks. In writing a track to cache, a TCB allocates one or more segments of cache storage to write the track. Similarly, the storage manager 24 (FIG. 2) in one embodiment may transfer data from the primary storage drive 10a (FIG. a) to a secondary storage drive 10b in tracks. As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in cache write and cache operation processes in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
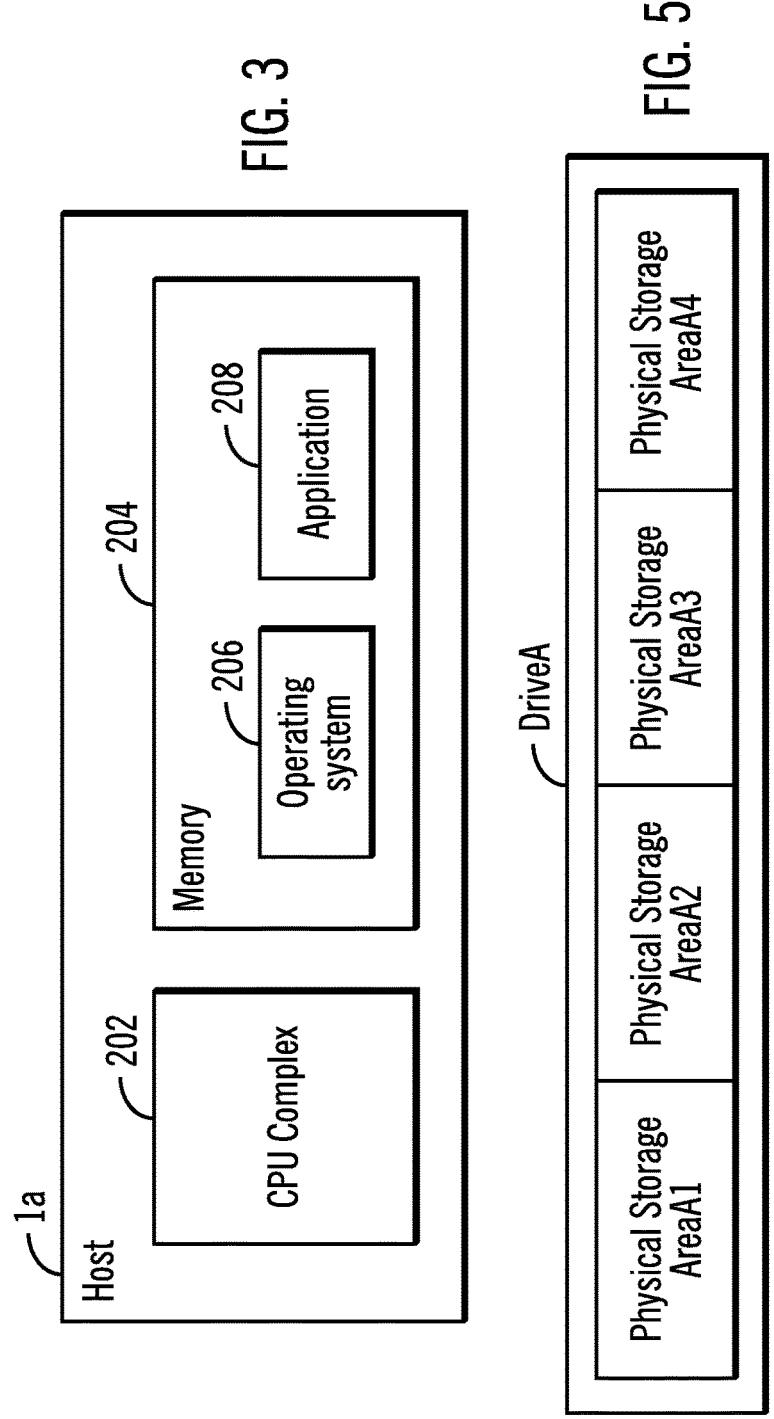
FIG. 3 illustrates an example of a host in the computing environment of FIG. 1.

A typical host as represented by the host 1a of FIG. 3 includes a CPU complex 202 and a memory 204 having an operating system 206 and an application 208 that cooperate to read data from and write data updates to the storage 10 (FIG. 2), 10a, 10b via a storage controller 4, 4a, 4b. An example of a suitable operating system is the z/OS operating system. It is appreciated that other types of operating systems may be employed, depending upon the particular application.

Figure 4:
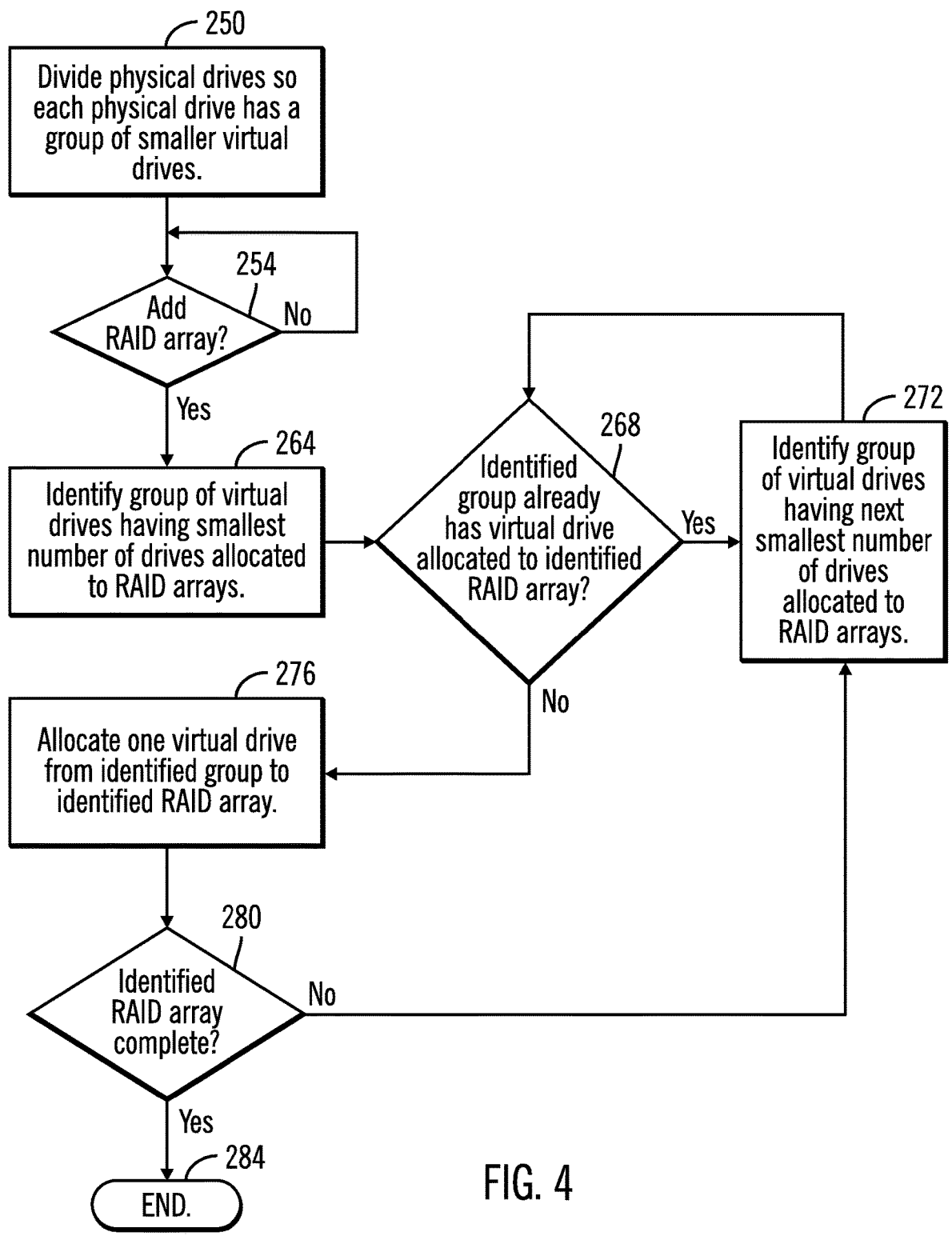
FIG. 4 illustrates an example of RAID array formation with virtual storage drives in accordance with one aspect of the present description.

FIG. 4 depicts one example of operations of virtual storage drive management logic 34 (FIG. 2) to configure RAID arrays with virtual storage drives obtained from groups of virtual storage drives created by the virtual storage drive management logic 34. In one embodiment, the virtual storage drive management logic 34 is configured to create (block 250, FIG. 4) a group of virtual storage drives from a physical storage drive by subdividing a storage area of a physical storage drive into a group of smaller storage areas. FIG. 5 shows an example of a physical storage drive, driveA in this example, having a physical storage area configured to store data, in which the physical storage area has been subdivided into a group of smaller physical storage areas. In this example, the physical storage area of the physical storage driveA is subdivided into four smaller storage areas, AreaA1, AreaA2 . . . Area4. It is appreciated that the size and number of the resultant subdivided physical storage areas may vary, depending upon the particular application. For example, a 15 terabyte physical storage drive may be fragmented into 15 smaller virtual storage drives, each having a virtual storage capacity of 1 terabyte each.

The four smaller storage areas, AreaA1, AreaA2 . . . Area4 of the physical storage drive form a group, designated Group A which also includes the virtual storage drives mapped to the storage areas of GroupA. As depicted in the rows of the table of FIG. 6, the virtual storage drive management logic 34 is configured to map each physical storage area of the GroupA to a single virtual storage drive of the GroupA of virtual storage drives. Thus, the physical storage areaA1 of GroupA is mapped to the single virtual storage driveA1 also of GroupA, the physical storage areaA2 of GroupA is mapped to the single virtual storage driveA2 also of GroupA, and so on. In this manner, the storage capability of virtual storage driveA1 is provided by physical storage AreaA1 of physical storage driveA, the storage capability of virtual storage driveA2 is provided by physical storage AreaA2 of the same physical storage driveA, and so on. Because the storage capability of the virtual storage drives, DriveA1-DriveA4, is provided by the same physical storage drive, DriveA, the virtual storage drives, DriveA1-DriveA4, are assigned to the same group, that is, GroupA in this example. Additional physical drives of a storage system 2 (FIG. 2) may be subdivided and mapped to other groups of virtual storage drives in a similar manner.

Having formed groups of virtual storage drives in which each virtual storage drive of a group is mapped to the same physical storage drive of the group, a RAID array may be configured from individual virtual storage drives of the groups in a manner similar in some regards to RAID allocation procedures for physical storage drives. However, as explained in greater detail below, in one aspect of the present description, virtual storage drives are selected to construct RAID arrays in a manner which reduces loss of data due to loss of physical storage drives and in a manner which can improve performance of the virtual storage drives.

Figure 7:
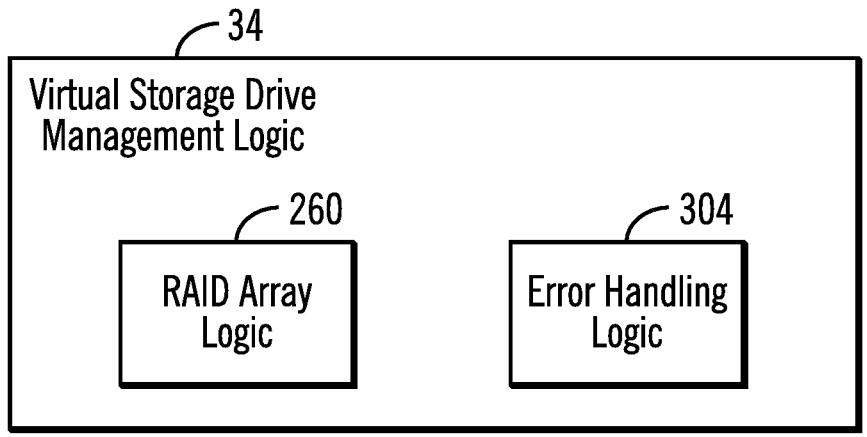
FIG. 7 is an example of virtual storage drive management logic in accordance with one aspect of the present description.

In the embodiment of FIG. 4, upon a determination (block 254, FIG. 4) to add a RAID array, RAID array logic 260 (FIG. 7) of the virtual storage drive management logic 34 is configured to allocate virtual storage drives to Redundant Array of Independent Disks (RAID) arrays of virtual storage drives. In one embodiment, the RAID array logic 260 (FIG. 7) of the virtual storage drive management logic 34 is configured to perform an automatic group identification and drive allocation operation which includes for an identified RAID array to be formed, identifying a group of virtual storage drives which has no virtual storage drives allocated to the identified RAID array and also has a fewest number of virtual storage drives allocated to any RAID array so long as the identified group of virtual storage drives has no virtual storage drives allocated to the identified RAID array. Thus, in the embodiment of FIG. 4, the RAID array logic 260 (FIG. 7) is configured to identify (block 264, FIG. 4) a group of virtual storage drives having the smallest number of virtual storage drives allocated to any RAID array and determining (block 268, FIG. 4) whether the identified group already has a virtual storage drive allocated to the identified RAID array. If so, the RAID array logic 260 (FIG. 7) is configured to identify (block 272, FIG. 4) a group of virtual storage drives having the next smallest number of virtual storage drives allocated to any RAID array and determining again (block 268, FIG. 4) whether the identified group already has a virtual storage drive allocated to the identified RAID array.

Once a group of virtual storage drives which meets both conditions: 1) having no other virtual storage drives allocated to the identified RAID array being formed, and 2) having the fewest number of virtual storage drives allocated to any RAID array as compared to the other groups of virtual storage drives having no virtual storage drives allocated to the identified RAID array being formed, the group identification and drive allocation operation further includes allocating one virtual storage drive from the identified group to the identified RAID array being formed. Thus, in the illustrated embodiment, the RAID array logic 260 (FIG. 7) is further configured to allocate (block 276, FIG. 4) one (and only one) virtual storage drive from the identified group to the identified RAID array being formed.

The RAID array logic 260 (FIG. 7) in performing the group identification and drive allocation operation, is further configured to determine (block 280, FIG. 4) whether the RAID array being formed is complete. If not, the automatic operations of blocks 272, 268 and 276 are repeated until the formation of the RAID array is complete (block 284, FIG. 4). Each time a virtual storage drive is added to the RAID array being formed, the virtual storage drive is added from a group which meets both conditions: 1) having no other virtual storage drives allocated to the identified RAID array being formed, and 2) having the fewest number of virtual storage drives allocated to any RAID array as compared to the other groups of virtual storage drives having no virtual storage drives allocated to the identified RAID array being formed.

As a result, each virtual storage drive of any one RAID array is selected from different unique groups such that no RAID array has multiple virtual storage drives from the same physical storage drive. In this manner, loss of two or more virtual drives in a RAID array due to the loss of a single physical storage drive is prevented. Thus, failure of a single physical drive will affect at most a single virtual storage drive of any one RAID array. Consequently, using known RAID array techniques, the data of the RAID array may be reconstructed since at most only a single virtual drive would be lost in the event of a single physical storage device failure.

Moreover, because each virtual storage drive of any one RAID array is selected from a group having the fewest number of virtual storage drives allocated to any RAID array as compared to the other groups of virtual storage drives having no virtual storage drives allocated to the identified RAID array being formed, the virtual storage drives allocated to RAID arrays may be more uniformly distributed among the physical drives. Hence, performance degradation due to overloading any one physical drive may be ameliorated.

In the example of FIG. 6, the virtual storage driveA1 of the GroupA is allocated to a RAID ArrayA. However, in the example of FIG. 6, and in accordance with the group identification and drive allocation operation described above in connection with FIG. 4, no other virtual storage drive of the GroupA is allocated to the same RAID array. Thus, the virtual storage driveA2 of GroupA is allocated to a RAID ArrayD, the virtual storage driveA3 of the GroupA is allocated to RAID ArrayC, and the virtual storage driveA4 of GroupA has yet to be allocated to any RAID array and thus is indicated as unallocated.

Figure 8:
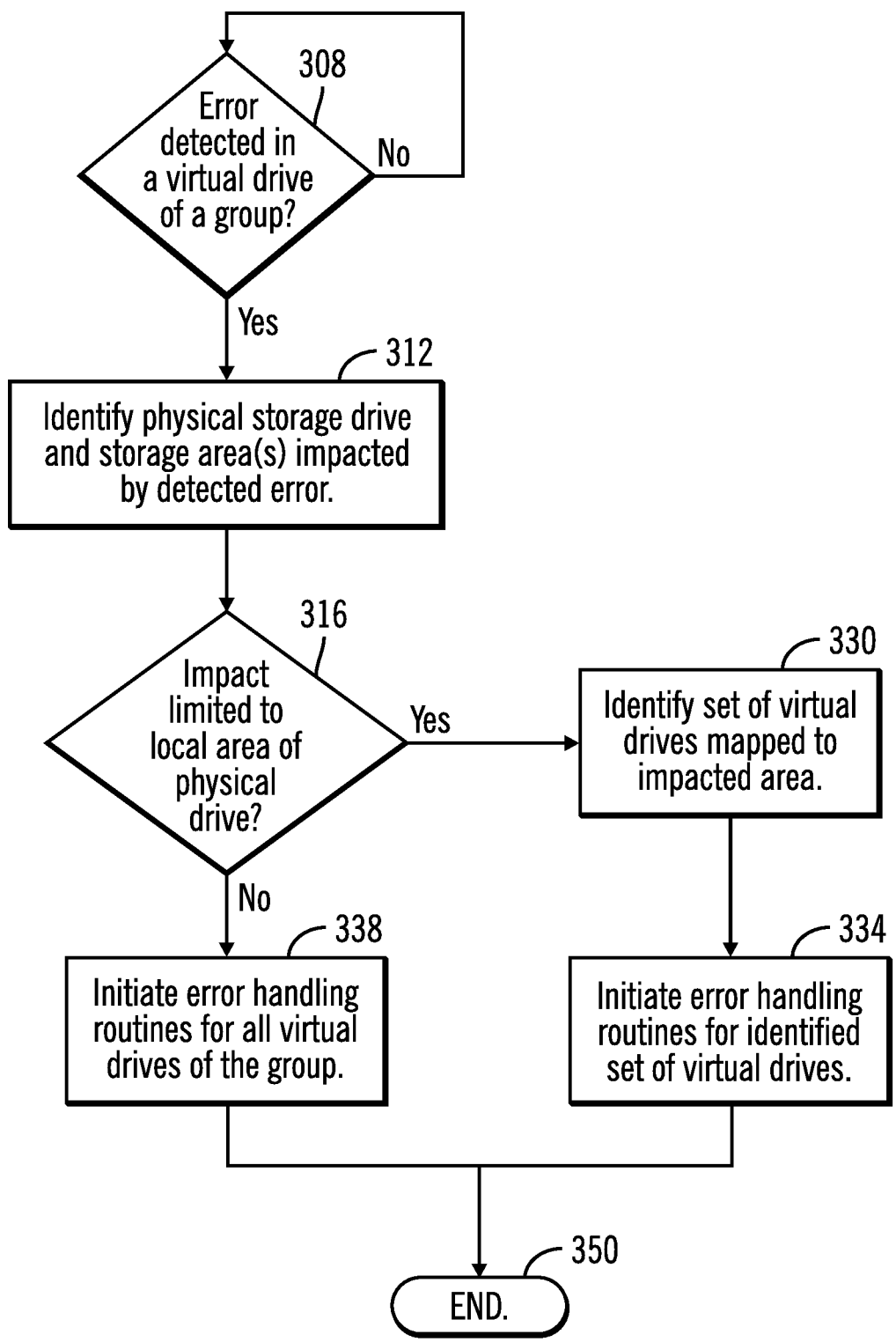
FIG. 8 depicts an example of error handling operations in one embodiment of virtual storage drive management in a data storage system in accordance with one aspect of the present description.

FIG. 8 depicts one example of automatic operations of virtual storage drive management logic 34 (FIG. 2) to classify and handle error from storage drives into two categories—a) Local Area Error that only affects one virtual drive or a subset of virtual drives of the group of virtual storage drives mapped to a physical storage drive and b) Global Area Error in a storage drive that that impacts all virtual storage drives of a physical storage drive. In the example of FIG. 8, the virtual storage drive management logic 34 (FIG. 7) includes error handling logic 304 configured to detect (block 308, FIG. 8) an error in a virtual storage drive and automatically identify (block 312, FIG. 8) which physical storage drive is mapped to the virtual drive having a detected error. Thus, for example, if an error is detected in virtual storage driveA2, the virtual drive mapping table of FIG. 6 indicates that virtual storage driveA2 of GroupA is mapped to physical storage driveA.

Figure 9:
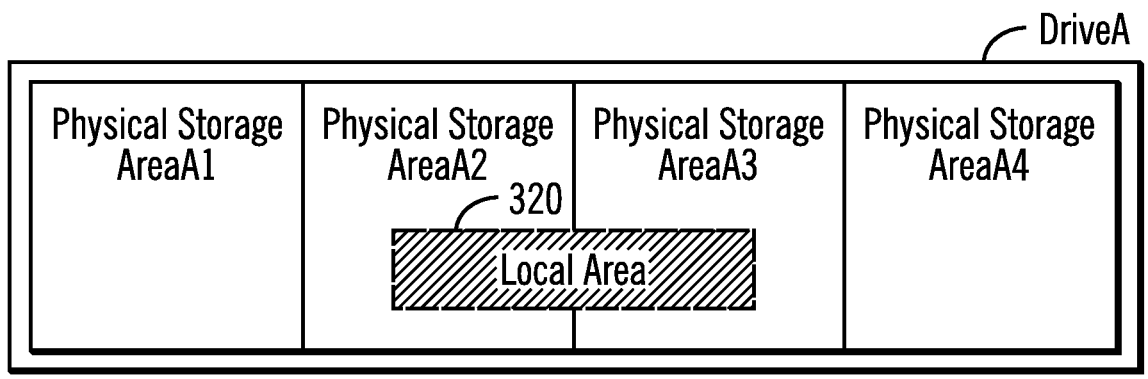
FIG. 9 depicts an example of a local area of error impact in virtual storage drives supported by a physical storage drive in connection with error handling operations in one embodiment of virtual storage drive management in accordance with one aspect of the present description.

The error handling logic 304 is further configured to identify (block 316, FIG. 8) which storage area or areas of the identified physical storage drive are affected by the error. In the example of FIG. 9, it is determined that a storage area 320 of the physical storage driveA is affected by the detected error. For example, the storage area 320 may exhibit a media error. As shown in FIG. 9, the affected storage area 320 is local in nature, that is, the error affected storage area 320 extends into some but not all of the physical storage areas of the physical storage driveA. Thus, in the example of FIG. 9, the affected storage area 320 extends into physical storage areas, AreaA2 and AreaA3 but not into physical storage areas, AreaA1 or AreaA4, of physical storage DriveA. Accordingly, in this example, it is determined (block 316, FIG. 8) that the detected error is limited to a local area (local area 320) of the physical storage driveA.

If it is determined (block 316, FIG. 8) that the detected error is limited to a local area of the physical storage drive, error handling logic 304 is further configured to identify (block 330, FIG. 8) the virtual storage drive or if more than one, the set of virtual storage drives mapped to the error affected local storage area. As noted above, in the example of FIG. 9, the affected storage area 320 extends into physical storage areas, AreaA2 and AreaA3 but not into physical storage areas, AreaA1 or AreaA4, of physical storage DriveA. The virtual drive mapping table of FIG. 6 indicates that virtual storage AreaA2 is mapped to virtual storage DriveA2. In addition, virtual storage AreaA3 is mapped to virtual storage DriveA3. Accordingly, virtual storage drives, DriveA2 and DriveA3, are automatically identified (block 330, FIG. 8) as mapped to the impacted local area 320.

Having identified the virtual storage drive or drives mapped to the error affected local storage area 320, the error handling logic 304 is further configured to automatically initiate (block 334, FIG. 8) error handling routes for the identified set of virtual storage drives, DriveA2 and DriveA3. For example, the virtual drive mapping table of FIG. 6 indicates that virtual storage DriveA2 was allocated to RAID ArrayD. Accordingly, a new virtual storage drive may be substituted in the RAID ArrayD for the failed virtual storage DriveA2 which is removed from the RAID ArrayD. The substitute virtual storage drive is selected in the manner described above in connection with FIG. 4 from a group which does not have any virtual storage drive already allocated to the RAID ArrayD. The data previously stored on the failed virtual storage DriveA2 may be reconstructed on the substitute virtual storage drive using known RAID techniques.

In a similar manner, the virtual drive mapping table of FIG. 6 indicates that virtual storage DriveA3 was allocated to RAID ArrayC. Accordingly, a new virtual storage drive may be substituted in the RAID ArrayC for the failed virtual storage DriveA3 in the manner described above in connection with FIG. 4. The data previously stored on the failed virtual storage DriveA3 may be reconstructed on the substitute virtual storage drive using known RAID techniques.

Thus, if the error handling logic 304 (FIG. 7) determines that the combined storage areas identified as impacted by a detected error are less than total storage areas of the identified physical storage drive, a set of virtual storage drives mapped to the combined error affected storage areas identified as impacted by a detected error are identified, and error handling routines for the identified set of virtual drives are initiated. In this manner, error handling routines may be focused upon the impacted virtual storage drives of a physical storage drive while bypassing virtual storage drives (such as virtual storage drives, DriveA1 and DriveA4, in this example) of the same physical storage drive (physical storage DriveA in this example) which are not impacted by the error. As a result, efficiency in error handling may be improved.

If the error handling logic 304 (FIG. 7) determines (block 316, FIG. 8) that all storage areas of the identified physical storage drive are impacted by a detected error, error handling routines may be initiated (block 338, FIG. 8) for all virtual storage drives of the identified physical storage drive. For example, the identified physical storage drive may have suffered a catastrophic failure of the entire drive. Thus, if the detected error is a Global Area Error that impacts all virtual storage drives of a physical storage drive, each virtual storage drive impacted by the Global Area Error and allocated to a RAID array may be removed from the associated RAID array and a new virtual storage drive may be selected from a group which does not already have any virtual storage drives allocated to the RAID array of the failed virtual storage drive.

Figure 10:
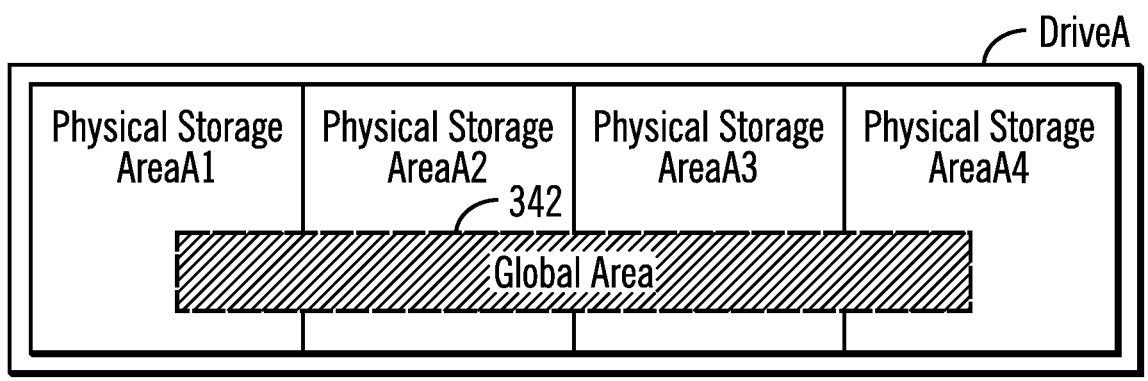
FIG. 10 depicts an example of a global area of error impact in virtual storage drives supported by a physical storage drive in connection with error handling operations in one embodiment of virtual storage drive management in accordance with one aspect of the present description.

In the example of FIG. 10, it is determined that a storage area 342 of the physical storage driveA is affected by the detected error. As shown in FIG. 10, the error affected storage area 342 is global in nature, that is, the error affected storage area 342 extends into all of the physical storage areas of the physical storage driveA. Thus, in the example of FIG. 10, the affected storage area 342 extends into each of the physical storage areas, AreaA1, AreaA2, AreaA3 and AreaA4 of physical storage DriveA. Accordingly, in this example, it is determined (block 312, FIG. 8) that the detected error is a global area error extending to all storage areas of the physical storage driveA.

If it is determined (block 312, FIG. 8) that the detected error is not limited to a local area of the physical storage drive, error handling logic 304 is further configured to initiate (block 338, FIG. 8) error handling routines for all the virtual storage drives of the affected physical storage drive which is physical storage DriveA in the example of FIG. 10. The virtual drive mapping table of FIG. 6 indicates that virtual storage DriveA1 mapped to the physical storage AreaA1 of the physical storage DriveA was allocated to RAID ArrayA. Accordingly, a new virtual storage drive may be substituted in the RAID ArrayA for the failed virtual storage DriveA1 which is removed from the RAID ArrayA. The substitute virtual storage drive is selected in the manner described above in connection with FIG. 4 from a group which does not already have any virtual storage drive allocated to the RAID ArrayA. The data previously stored on the failed virtual storage DriveA2 may be reconstructed on the substitute virtual storage drive using known RAID techniques.

In a similar manner, the failed virtual storage drives, DriveA2 and DriveA3 may be removed from their RAID arrays, ArrayD and ArrayC, respectively, as described above and substituted from different groups so that no two virtual storage drives allocated to the same RAID array are mapped to the same group or physical storage drive. The data previously stored on the failed virtual storage drives, DriveA2 and DriveA3 may be reconstructed on the substitute virtual storage drives for their associated RAID arrays using known RAID techniques.

Thus, if the error handling logic 304 (FIG. 7) determines that the combined storage areas identified as impacted by a detected error equal the total storage areas of the identified physical storage drive, all of the virtual storage drives mapped to the affected physical storage drive are identified, and error handling routines for each of the virtual storage drives of the physical storage drive are initiated. In the example of FIG. 6, the physical storage areaA4 of the Global Area 342 (FIG. 1) was not allocated to a virtual storage drive and therefore need not be removed from any RAID array. Upon completion of the error handling routes for either the limited set of affected virtual storage drives (block 334) or the full set of affected virtual storage drives (block 338), the error handing of the error handling logic 304 (FIG. 7) is complete (block 350, FIG. 8).

In another aspect of the present description, it is appreciated that because a physical storage drive may be shared via virtual storage drives across many RAID arrays, one physical storage drive may experience a much higher workload of stage or destage operations than other physical storage drives, depending upon which RAID arrays are supported by the individual physical storage drives. Hence, prior stage or destage operations which throttled TCBs based upon a RAID array, may not adequately prevent overloads on particular physical storage drives, if the RAID arrays receiving the stage or destage operations are concentrated amongst relatively few physical storage drives. If a particular physical storage drive is overloaded with stage or destage operations directed to RAID arrays supported by the physical storage drive, the overloaded physical storage drive may experience overdrive and time out on input/output operations, thereby adversely affecting performance.

Figure 11:
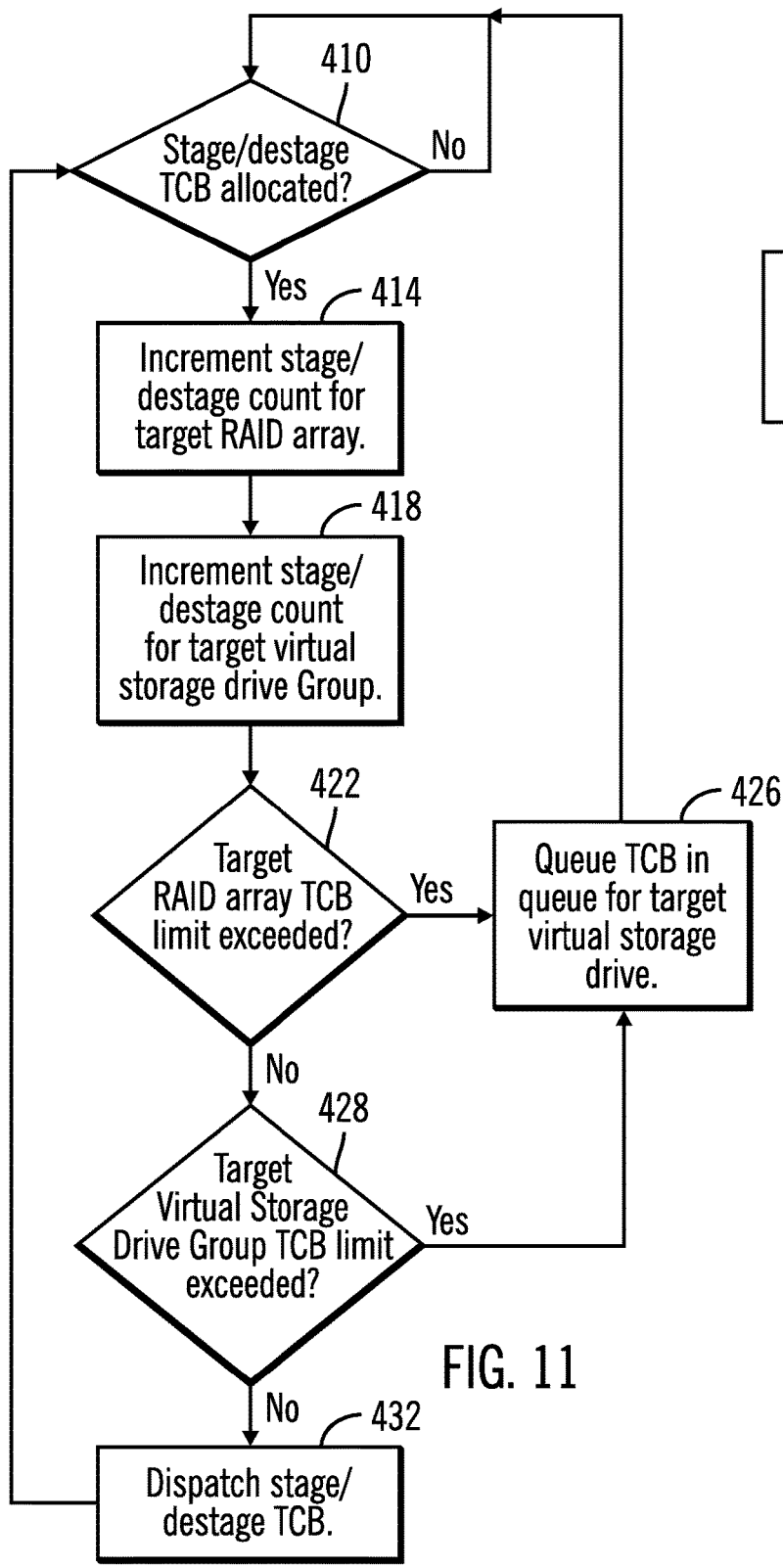
FIG. 11 depicts an example of TCB throttling operations as a function of both target RAID array and target virtual storage drive group identities in accordance with one aspect of the present description.

FIG. 11 depicts one example of operations of virtual storage drive management logic 34 (FIG. 2) to manage cache operations including stage and destage operations between storage drives and a cache. In yet another aspect of a storage controller or other computer system employing virtual storage drive management in accordance with the present description, target threshold level logic 404 (FIG. 12) of the cache operation logic 40 determines both whether an allocated task control block for controlling a cache operation directed to a target virtual storage drive of a particular (target) RAID array, exceeds a first limit of allocated task control blocks assigned to the target RAID array, and if not, also determines whether the allocated task control block for controlling a cache operation directed to the target virtual storage drive, exceeds a second limit of allocated task control blocks assigned to the target group of virtual storage drives (all mapped to the same physical storage drive) of which the target virtual storage drive is a member. If neither limit is exceed, the task control block is dispatched to perform the associated cache operation.

Conversely, if either limit is exceeded, wait queue logic 406 (FIG. 12) queues the allocated task control block in a TCB wait queue, an example of which is indicated at 408 in FIG. 13, for the target virtual storage drive, to defer dispatching of the allocated task control block. A TCB is enqueued at the back 408a of the TCB wait queue 408 to await deallocation of a sufficient number of TCBs directed to the target virtual storage drive. The TCBs are enqueued on the TCB wait queue in the order in which they will be subsequently dequeued and dispatched to perform a cache operation. Accordingly, the TCB at the front 408b will be dequeued from the TCB wait queue 408 before any other TCB of the TCB wait queue. Conversely the TCB at the end 408a will be dequeued and dispatched after all TCBs positioned ahead of that TCB initially positioned at the end 408a of the TCB wait queue have been dispatched to perform a cache operation for the target virtual storage drive of the TCB wait queue.

A TCB is deallocated upon completion of the cache operation controlled by the TCB. Upon deallocation of a sufficient number of task control blocks directed to the target virtual storage drive, the wait queue logic 406 (FIG. 12) removes a waiting task control block from the front 408b (FIG. 13) of the TCB wait queue 408 for the target virtual storage drive and dispatches the removed task control block to perform a cache operation directed to the target virtual storage drive. In the illustrated embodiment, deallocation of a sufficient number of task control blocks directed to the target virtual storage drive is satisfied if neither the incremented count of the number of cache operation TCBs which are currently allocated to the target RAID array of the target virtual storage drive exceeds a particular limit of allocated task control blocks assigned to the target RAID array, and if the incremented count of the number of cache operation TCBs which are currently allocated to the target virtual storage drive Group of the target virtual storage drive does not exceed a particular limit of allocated task control blocks assigned to the target virtual storage drive Group, all of which are mapped to the same physical storage drive. In this manner, task control blocks may be throttled both on the basis of the identity of the target RAID array of the target virtual storage drive as well as the identity of the target Group (or physical storage drive) of the target virtual storage drive, to avoid overloading any one particular RAID array or physical storage drive with too many cache operations. As a result, system performance may be improved.

In the embodiment of FIG. 11, cache operation logic 40 (FIG. 12) is configured to receive (block 410, FIG. 11) a task control block allocated to control a cache operation to transfer data between a cache and a particular virtual storage drive, referred to herein as the target virtual storage drive such as the virtual storage DriveA1 (FIG. 6) of a particular RAID array referred to herein as the target RAID array, such as the RAID ArrayA (FIG. 6) which includes the target virtual storage driveA1. The target virtual storage drive of the allocated TCB is also a member of a particular Group of virtual storage drives, referred to herein as the target Group, such as the GroupA (FIG. 6) which includes the target virtual storage driveA1, for example. As previously mentioned, each Group of virtual storage drives is defined by the particular physical storage drive to which all virtual storage drives of the Group are mapped. Thus in this example in which the allocated cache operation is directed to the target virtual storage driveA1, the physical storage driveA supporting the target virtual storage driveA1 is referred to herein as the target physical storage drive, that is, the target physical storage driveA (FIG. 5). As previously mentioned, the cache operation may be a stage operation to stage data from the target virtual storage drive to the cache or a destage operation to destage data from the cache to the target virtual storage drive.

Target threshold level logic 404 (FIG. 12) is configured to keep track of both the number of cache operation TCBs currently allocated to each RAID array and also the number of cache operation TCBs currently allocated to each virtual storage drive Group. Hence, upon the allocation (block 410, FIG. 11) of a cache operation directed to a particular virtual storage drive, that is the target virtual storage drive, the target threshold level logic 404 is configured to increment (block 414, FIG. 11) a count of the number of cache operation TCBs which are currently allocated to the target RAID array which includes the target virtual storage drive of the allocated cache operation and also to increment (block 418, FIG. 11) a separate count of the number of cache operation TCBs which are currently allocated to the target virtual storage drive Group which includes the target virtual storage drive of the allocated cache operation.

Target threshold level logic 404 (FIG. 12) is further configured to determine (block 422, FIG. 11) whether the incremented count of the number of cache operation TCBs which are currently allocated to the target RAID array of the target virtual storage drive exceeds a particular limit of allocated task control blocks assigned to the particular RAID array. If so, instead of dispatching the allocated task control block to perform a cache operation directed to the target virtual storage drive of the target RAID array, the allocated task control block is instead queued (block 426, FIG. 11) in a queue 408 (FIG. 13) of waiting task control blocks for the target virtual storage drive.

Conversely, if the incremented count of the number of cache operation TCBs which are currently allocated to the target RAID array of the target virtual storage drive does not exceed a particular limit of allocated task control blocks assigned to the target RAID array, target threshold level logic 404 (FIG. 12) is further configured to determine (block 428, FIG. 11) if the incremented count of the number of cache operation TCBs which are currently allocated to the target virtual storage drive Group of the target virtual storage drive exceeds a particular limit of allocated task control blocks assigned to the target virtual storage drive Group. If so, instead of dispatching the allocated task control block to perform a cache operation directed to the target virtual storage drive of the target virtual storage drive Group, the allocated task control block is instead queued (block 426, FIG. 11) in a queue 408 (FIG. 13) of waiting task control blocks for the target virtual storage drive.

If neither the incremented count of the number of cache operation TCBs which are currently allocated to the target RAID array of the target virtual storage drive is determined (block 422, FIG. 11) to exceed a particular limit of allocated task control blocks assigned to the target RAID array, nor the incremented count of the number of cache operation TCBs which are currently allocated to the target virtual storage drive Group of the target virtual storage drive is determined (block 428, FIG. 11) to exceed a particular limit of allocated task control blocks assigned to the target virtual storage drive Group, target threshold level logic 404 (FIG. 12) is further configured to dispatch (block 432, FIG. 11) the allocated task control block to perform a cache operation directed to the target virtual storage drive of the target RAID array and of the target virtual storage drive Group as explained in greater detail below.

In the illustrated embodiment, wait queue logic 406 (FIG. 12) of the cache operation logic 40 is configured to enqueue (block 426, FIG. 11)) the allocated task control block in a TCB wait queue 408 (FIG. 13) assigned to the target virtual storage drive of the target RAID array and of the target virtual storage drive Group if either the incremented count of the number of cache operation TCBs which are currently allocated to the target RAID array of the target virtual storage drive is determined (block 422, FIG. 11) to exceed the particular limit of allocated task control blocks assigned to the target RAID array or if the incremented count of the number of cache operation TCBs which are currently allocated to the target virtual storage drive Group of the target virtual storage drive is determined (block 428, FIG. 11) to exceed a particular limit of allocated task control blocks assigned to the particular virtual storage drive Group. As explained in greater detail below in connection with FIG. 16, TCBs enqueued on a TCB wait queue for the target virtual storage drive await deallocation of a sufficient number of TCBs for the target virtual storage drive before dispatching a TCB waiting on the queue to perform a cache operation directed to the target virtual storage drive. In this manner, the number of task control blocks for cache operations targeting the RAID array of the virtual storage drive and the number of task control blocks for cache operations targeting the virtual storage drive Group of the target virtual storage drive, may each be separately throttled to reduce or eliminate overdriving either a target RAID array or a physical storage drive defining the virtual storage drive Group of the target virtual storage drive, and therefore reduce or eliminate degradation in performance due to overdriving.

In the illustrated embodiment, each virtual storage drive is assigned a TCB wait queue as a function of the identity of the RAID array to which the virtual storage drive has been allocated and the identity of the virtual storage drive Group of which the virtual storage drive is a member. As previously mentioned, each virtual storage drive Group is defined by the unique physical storage drive to which each virtual storage drive of the Group is mapped. FIG. 14 is a table mapping each virtual storage drive to a particular TCB wait queue as a function of the identity of the RAID array to which the virtual storage drive has been allocated and the identity of the virtual storage drive Group of which the virtual storage drive is a member. Thus as shown in FIGS. 6 and 14, virtual storage driveA1, for example, which has been allocated to RAID arrayA and is a member of virtual storage drive GroupA (of physical storage DriveA), is assigned a TCB wait queueAA. In a similar manner, virtual storage driveA2, for example, which has been allocated to RAID arrayD and is also a member of virtual storage drive GroupA (of physical storage DriveA), is assigned a TCB wait queueDA.

In the illustrated embodiment, there are four RAID arrays, ArrayA-ArrayD, each array having four virtual storage drives, and four Groups of virtual storage drives, each Group having four virtual storage drives mapped to a unique physical storage drive, DriveA-DriveD. Thus, there are sixteen possible virtual storage drives, in this example, each virtual storage drive of each group being allocated to a different RAID array. Each of the sixteen possible virtual storage drives of this example may be assigned to a unique TCB wait queue. However, it is appreciated that that number of RAID storage arrays, virtual storage drive Groups, physical storage drives, virtual storage drives, and TCB wait queues, may vary, depending upon the particular application.

The TCB wait queue 408 (FIG. 13) is representative of each TCB wait queue of the table of FIG. 14. The cache operation logic 40 (FIG. 12) includes a memory resource 436 (FIG. 12) to implement each TCB wait queue. The operations of the wait queue logic 406 in processing each TCB wait queue to selectively de-queue task control blocks from a TCB wait queue and dispatch a de-queued task control block from a TCB wait queue is described in greater detail below in connection with FIG. 16.

Figure 15:
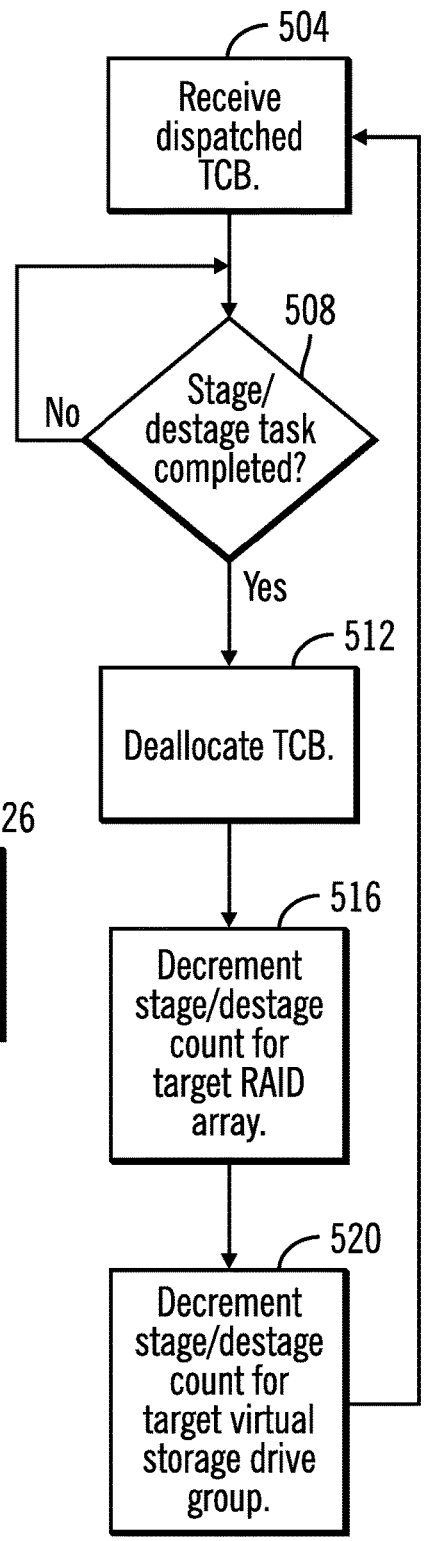
FIG. 15 depicts an example of TCB processing for a dispatched TCB in one embodiment employing virtual storage drive management in accordance with one aspect of the present description.

Referring to FIG. 15, the cache operation logic 40 (FIG. 12) is configured to receive (block 504) a dispatched task control block directed to a particular virtual storage drive (the target virtual storage drive) and perform the cache operation controlled by the received task control block. Thus, a segment of data may be staged from the target virtual storage drive to cache in a stage operation or a segment of data may be destaged from cache to the target virtual storage drive depending upon whether the received TCB is for a stage or a destage operation, respectively. Upon completion (block 508) of the cache operation, the dispatched TCB may be deallocated (block 512), freeing the TCB to be re-allocated for another cache operation.

In response to the de-allocation (block 512) of the TCB for a cache operation, the target threshold level logic 404 (FIG. 12) is configured to decrement (block 516, FIG. 15) the count of the number of cache operation TCBs which are currently allocated to the target RAID array of the target virtual storage drive of the de-allocated TCB operation. In addition, the target threshold level logic 404 (FIG. 12) also decrements (block 520, FIG. 15) the separate count of the number of cache operation TCBs which are currently allocated to the target virtual storage drive Group of the target virtual storage drive of the de-allocated cache operation TCB.

Figure 16:
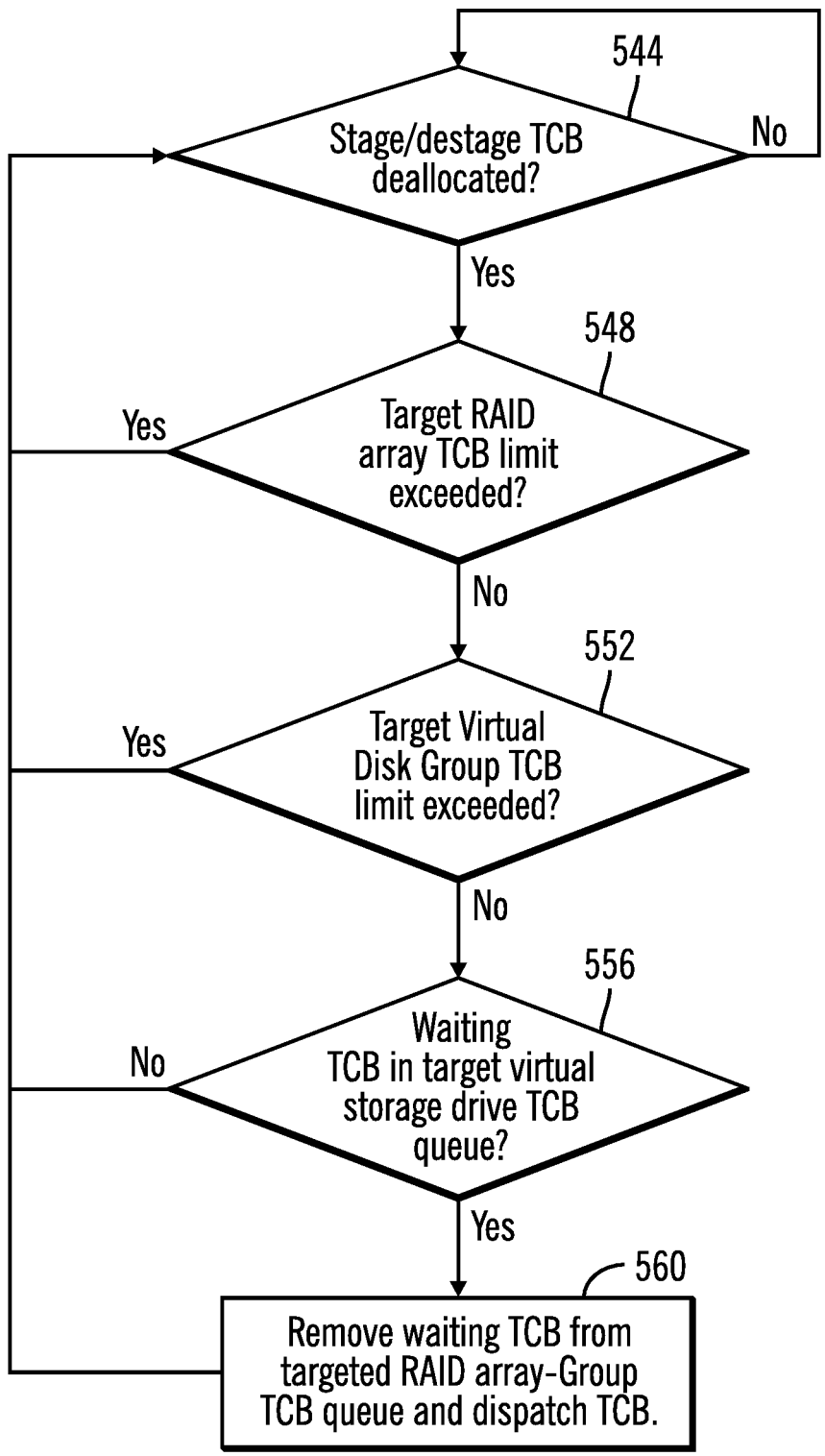
FIG. 16 depicts an example of TCB wait queue processing for a virtual storage drive in one embodiment employing virtual storage drive management in accordance with one aspect of the present description.

Referring to FIG. 16, the target threshold level logic 404 (FIG. 12) is further configured to, in response (block 544, FIG. 16) to the de-allocation of a TCB for a cache operation directed to a particular virtual storage drive (the target virtual storage drive), determine (block 548, FIG. 16) whether the count of the number of cache operation TCBs which are currently allocated to the target RAID array of the target virtual storage drive has been sufficiently decremented or instead continues to exceed the particular limit of allocated task control blocks assigned to the target RAID array. If the count of the number of cache operation TCBs which are currently allocated to the target RAID array of the target virtual storage drive continues to exceed the particular limit of allocated task control blocks assigned to the target RAID array, the target threshold level logic 404 (FIG. 12) is further configured to await (block 544, FIG. 16) additional de-allocations of TCBs directed to the target RAID array.

Conversely, if the count of the number of cache operation TCBs which are currently allocated to the target RAID array of the target virtual storage drive has been sufficiently decremented to no longer exceed the particular limit of allocated task control blocks assigned to the target RAID array, target threshold level logic 404 (FIG. 12) is further configured to determine (block 552, FIG. 16) whether the count of the number of cache operation TCBs which are currently allocated to the target virtual storage drive Group of the target virtual storage drive has been sufficiently decremented or instead continues to exceed the particular limit of allocated task control blocks assigned to the target virtual storage drive Group. If the count of the number of cache operation TCBs which are currently allocated to the target virtual storage drive Group of the target virtual storage drive has been sufficiently decremented to no longer exceed the particular limit of allocated task control blocks assigned to the target Group, a waiting TCB (block 556, FIG. 16) at the front 408*b* (FIG. 13) of the TCB wait queue 408 for the target virtual storage drive may be de-queued (block 560, FIG. 16), that is, removed from the wait queue and dispatched to perform the cache operation directed to the target virtual storage drive as described above in connection with FIG. 15. Conversely, if the count of the number of cache operation TCBs which are currently allocated to the target Group of the target virtual storage drive continues to exceed the particular limit of allocated task control blocks assigned to the target Group, the target threshold level logic 404 (FIG. 12) is further configured to await (block 544, FIG. 16) additional de-allocations of TCBs directed to the target Group of virtual storage drive.

Thus, a TCB waiting on a wait queue for the target virtual storage drive is not de-queued and dispatched to perform the cache operation of the TCB directed to the target virtual storage drive unless both the count of the number of cache operation TCBs which are currently allocated to the target RAID array of the target virtual storage drive has been sufficiently decremented to no longer exceed the particular limit of allocated task control blocks assigned to the target RAID array, and the count of the number of cache operation TCBs which are currently allocated to the target virtual storage drive Group of the target virtual storage drive has been sufficiently decremented so as to no longer exceed the particular limit of allocated task control blocks assigned to the target virtual storage drive Group. In this manner, dispatching of task control blocks for a particular virtual storage drive may be throttled both on the basis of the identity of the RAID array of the target virtual storage drive as well as the identity of the physical storage drive mapped to the virtual storage drive of the cache operation, to avoid overloading any one particular RAID array or any one physical storage drive with too many cache operations. As a result, system performance may be improved. Other aspects and advantages may be realized, depending upon the particular application.

Figure 17:
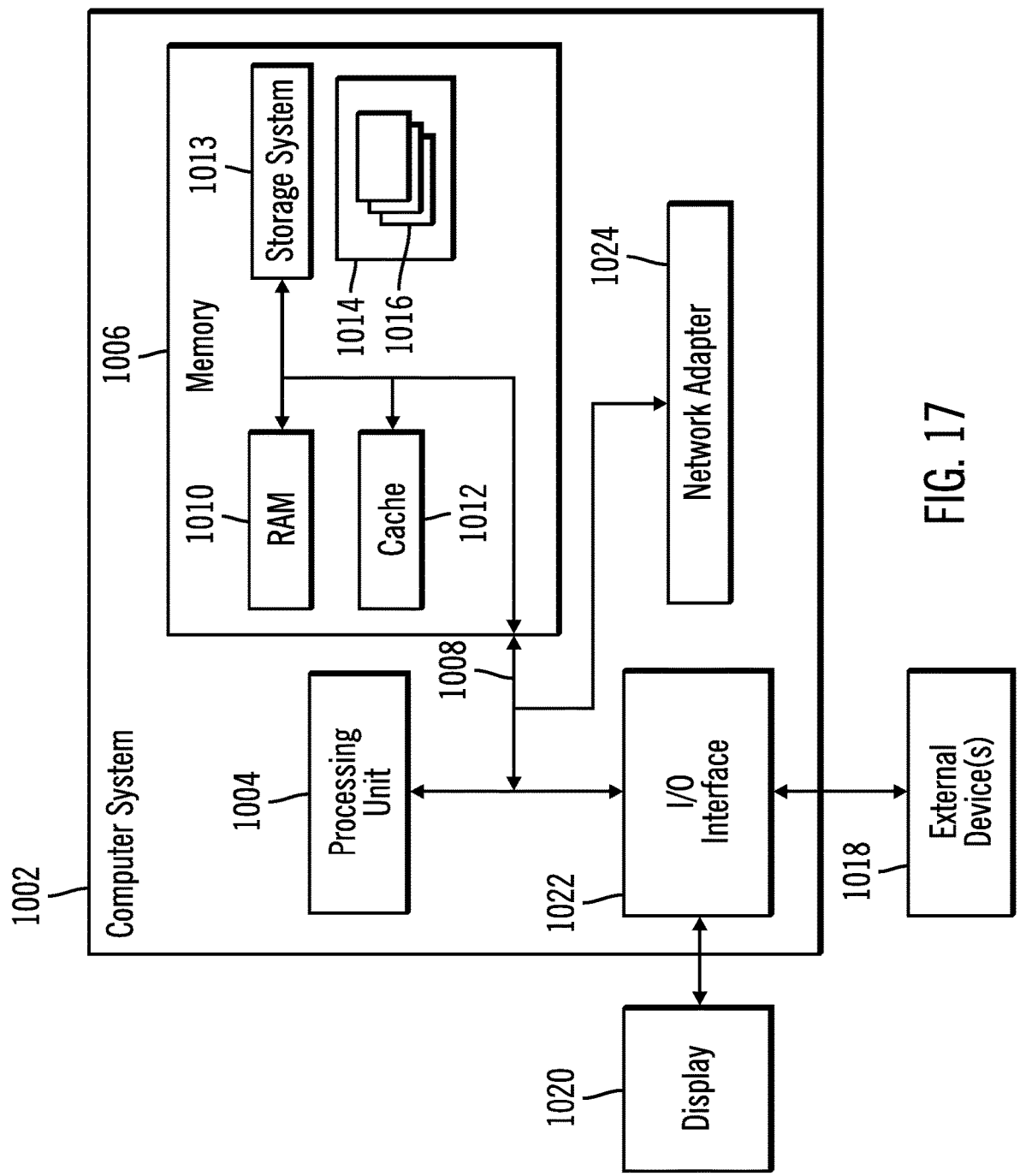
FIG. 17 illustrates a computer embodiment employing virtual storage drive management in a data storage system in accordance with the present description.

The computational components of the figures may each be implemented in one or more computer systems, such as the computer system 1002 shown in FIG. 17. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
creating a plurality of groups of virtual storage drives wherein creating a group of virtual storage drives includes subdividing a storage area of a physical storage drive into a group of smaller storage areas and mapping each smaller storage area of the group of smaller storage areas to a virtual storage drive of the group of virtual storage drives; and
allocating virtual storage drives to Redundant Array of Independent Disks (RAID) arrays of virtual storage drives wherein allocating virtual storage drives to a RAID array includes a group identification and drive allocation operation which includes for an identified RAID array, identifying a group of the plurality of groups of virtual storage drives as an identified group which has no virtual storage drives allocated to the identified RAID array and has a fewest number of virtual storage drives allocated to any RAID array and allocating one virtual drive from the identified group of virtual storage drives to the identified RAID array, determining if the identified RAID array is complete and repeating the group identification and drive allocation operation until the identified RAID array is complete.

2. The method of claim 1 further comprising:
detecting an error in a virtual storage drive of a group of virtual drives of a physical storage drive;
identifying which physical storage drive includes a virtual drive having a detected error;
identifying which storage areas of an identified physical storage drive are impacted by a detected error; and
determining if combined storage areas identified as impacted by a detected error are less than total storage areas of the identified physical storage drive and if so, identifying a set of virtual storage drives mapped to combined storage areas identified as impacted by a detected error, and initiating error handling routines for identified set of virtual drives.

3. The method of claim 2 further comprising determining if all storage areas of the identified physical storage drive are impacted by a detected error and if so, initiating error handling routines for all virtual storage drives of the group of virtual storage drives of the identified physical storage drive.

4. The method of claim 1 further comprising:
receiving a first task control block allocated to control a first cache operation to transfer data between a cache and a first target virtual storage drive of a first target RAID array and of a first target group of virtual storage drives of a first target physical storage drive wherein the first cache operation is one of a stage operation to stage data from the first target virtual storage drive to the cache and a destage operation to destage data from the cache to the first target virtual storage drive;
determining if the first allocated task control block exceeds a first limit of allocated task control blocks assigned to the first target RAID array; and
in response to a determination that the first allocated task control block exceeds the first limit of allocated task control blocks assigned to the first target RAID array, queueing the first allocated task control block in a wait queue to defer dispatching of the first allocated task control block to perform the first cache operation.

5. The method of claim 4 further comprising, in response to a determination that the first allocated task control block does not exceed the first limit of allocated task control blocks assigned to the first target RAID array, determining if the first allocated task control block exceeds a second limit of allocated task control blocks assigned to the first target group of virtual storage drives, and if not, dispatching the first allocated task control block to perform the first cache operation, instead of queueing the first allocated task control block in a wait queue to defer dispatching of the first allocated task control block to perform the first cache operation.

6. The method of claim 5 further comprising, in response to a determination that the first allocated task control block does exceed the second limit of allocated task control blocks assigned to the first target group of virtual storage drives, queueing the first allocated task control block in a wait queue to defer dispatching of the first allocated task control block to perform the first cache operation.

7. The method of claim 6 further comprising:
deallocating a task control block upon completion of a second cache operation to transfer data between a cache and a target virtual storage drive; and
removing a waiting task control block from a wait queue and dispatching the removed task control block to perform a cache operation if both the first limit of allocated task control blocks assigned to the first target RAID array is not exceeded, and if the second limit of allocated task control blocks assigned to the first target group of virtual storage drives, is not exceeded.

8. A computer program product for use with a data storage system having a storage controller and a plurality of physical storage drives controlled by the storage controller and configured to store data, wherein the storage controller has a processor and a cache and wherein the computer program product comprises a computer readable storage medium having program instructions embodied therewith, the program instructions executable by a processor of the storage controller to cause processor operations, the processor operations comprising:
creating a plurality of groups of virtual storage drives wherein creating a group of virtual storage drives includes subdividing a storage area of a physical storage drive into a group of smaller storage areas and mapping each smaller storage area of the group of smaller storage areas to a virtual storage drive of the group of virtual storage drives; and
allocating virtual storage drives to Redundant Array of Independent Disks (RAID) arrays of virtual storage drives wherein allocating virtual storage drives to a RAID array includes a group identification and drive allocation operation which includes for an identified RAID array, identifying a group of the plurality of groups of virtual storage drives as an identified group which has no virtual storage drives allocated to the identified RAID array and has a fewest number of virtual storage drives allocated to any RAID array and allocating one virtual drive from the identified group of virtual storage drives to the identified RAID array, determining if the identified RAID array is complete and repeating the group identification and drive allocation operation until the identified RAID array is complete.

9. The computer program product of claim 8 wherein the processor operations further comprise:
detecting an error in a virtual storage drive of a group of virtual drives of a physical storage drive;

identifying which physical storage drive includes a virtual drive having a detected error;
identifying which storage areas of an identified physical storage drive are impacted by a detected error; and
determining if combined storage areas identified as impacted by a detected error are less than total storage areas of the identified physical storage drive and if so, identifying a set of virtual storage drives mapped to combined storage areas identified as impacted by a detected error, and initiating error handling routines for identified set of virtual drives.

10. The computer program product of claim 9 wherein the processor operations further comprise determining if all storage areas of the identified physical storage drive are impacted by a detected error and if so, initiating error handling routines for all virtual storage drives of the group of virtual storage drives of the identified physical storage drive.

11. The computer program product of claim 8 wherein the processor operations further comprise:
receiving a first task control block allocated to control a first cache operation to transfer data between a cache and a first target virtual storage drive of a first target RAID array and of a first target group of virtual storage drives of a first target physical storage drive wherein the first cache operation is one of a stage operation to stage data from the first target virtual storage drive to the cache of the first cache operation and a destage operation to destage data from the cache of the first cache operation to the first target virtual storage drive;
determining if the first allocated task control block exceeds a first limit of allocated task control blocks assigned to the first target RAID array; and
in response to a determination that the first allocated task control block exceeds the first limit of allocated task control blocks assigned to the first target RAID array, queueing the first allocated task control block in a wait queue to defer dispatching of the first allocated task control block to perform the first cache operation.

12. The computer program product of claim 11 wherein the processor operations further comprise, in response to a determination that the first allocated task control block does not exceed the first limit of allocated task control blocks assigned to the first target RAID array, determining if the first allocated task control block exceeds a second limit of allocated task control blocks assigned to the first target group of virtual storage drives, and if not, dispatching the first allocated task control block to perform the first cache operation, instead of queueing the first allocated task control block in a wait queue to defer dispatching of the first allocated task control block to perform the first cache operation.

13. The computer program product of claim 12 wherein the processor operations further comprise, in response to a determination that the first allocated task control block does exceed the second limit of allocated task control blocks assigned to the first target group of virtual storage drives, queueing the first allocated task control block in a wait queue to defer dispatching of the first allocated task control block to perform the first cache operation.

14. The computer program product of claim 13 wherein the processor operations further comprise:
deallocating a task control block upon completion of a second cache operation to transfer data between a cache and a target virtual storage drive; and
removing a waiting task control block from a wait queue and dispatching the removed task control block to perform a cache operation if both the first limit of allocated task control blocks assigned to the first target RAID array is not exceeded, and if the second limit of allocated task control blocks assigned to the first target group of virtual storage drives, is not exceeded.

15. A system, comprising:
a data storage system having a storage controller and a plurality of physical storage drives controlled by the storage controller and configured to store data, wherein the storage controller has a processor and a cache; and
a computer program product comprising a computer readable storage medium having program instructions embodied therewith, the program instructions executable by a processor of the storage controller to cause processor operations, the processor operations comprising:
creating a plurality of groups of virtual storage drives wherein creating a group of virtual storage drives includes subdividing a storage area of a physical storage drive into a group of smaller storage areas and mapping each smaller storage area of the group of smaller storage areas to a virtual storage drive of the group of virtual storage drives; and
allocating virtual storage drives to Redundant Array of Independent Disks (RAID) arrays of virtual storage drives wherein allocating virtual storage drives to a RAID array includes a group identification and drive allocation operation which includes for an identified RAID array, identifying a group of the plurality of groups of virtual storage drives as an identified group which has no virtual storage drives allocated to the identified RAID array and has a fewest number of virtual storage drives allocated to any RAID array and allocating one virtual drive from the identified group of virtual storage drives to the identified RAID array, determining if the identified RAID array is complete and repeating the group identification and drive allocation operation until the identified RAID array is complete.

16. The system of claim 15 wherein the processor operations further comprise:
detecting an error in a virtual storage drive of a group of virtual drives of a physical storage drive;
identifying which physical storage drive includes a virtual drive having a detected error;
identifying which storage areas of an identified physical storage drive are impacted by a detected error; and
determining if combined storage areas identified as impacted by a detected error are less than total storage areas of the identified physical storage drive and if so, identifying a set of virtual storage drives mapped to combined storage areas identified as impacted by a detected error, and initiating error handling routines for identified set of virtual drives.

17. The system of claim 16 wherein the processor operations further comprise determining if all storage areas of the identified physical storage drive are impacted by a detected error and if so, initiating error handling routines for all virtual storage drives of the group of virtual storage drives of the identified physical storage drive.

18. The system of claim 15 wherein the processor operations further comprise:
receiving a first task control block allocated to control a first cache operation to transfer data between a cache and a first target virtual storage drive of a first target RAID array and of a first target group of virtual storage drives of a first target physical storage drive wherein the first cache operation is one of a stage operation to stage data from the first target virtual storage drive to the cache of the first cache operation and a destage operation to destage data from the cache of the first cache operation to the first target virtual storage drive;

determining if the first allocated task control block exceeds a first limit of allocated task control blocks assigned to the first target RAID array; and in response to a determination that the first allocated task control block exceeds the first limit of allocated task control blocks assigned to the first target RAID array, queueing the first allocated task control block in a wait queue to defer dispatching of the first allocated task control block to perform the first cache operation.

19. The system of claim 18 wherein the processor operations further comprise, in response to a determination that the first allocated task control block does not exceed the first limit of allocated task control blocks assigned to the first target RAID array, determining if the first allocated task control block exceeds a second limit of allocated task control blocks assigned to the first target group of virtual storage drives, and if not, dispatching the first allocated task control block to perform the first cache operation, instead of queueing the first allocated task control block in a wait queue to defer dispatching of the first allocated task control block to perform the first cache operation.

20. The system of claim 19 wherein the processor operations further comprise, in response to a determination that the first allocated task control block does exceed the second limit of allocated task control blocks assigned to the first target group of virtual storage drives, queueing the first allocated task control block in a wait queue to defer dispatching of the first allocated task control block to perform the first cache operation.

21. The system of claim 20 wherein the processor operations further comprise:

deallocating a task control block upon completion of a second cache operation to transfer data between a cache and a target virtual storage drive; and removing a waiting task control block from a wait queue and dispatching the removed task control block to perform a cache operation if both the first limit of allocated task control blocks assigned to the first target RAID array is not exceeded, and if the second limit of allocated task control blocks assigned to the first target group of virtual storage drives, is not exceeded.

* * * * *